(12) United States Patent
Hirasawa

(10) Patent No.: US 7,232,857 B2
(45) Date of Patent: Jun. 19, 2007

(54) RADIATION HARDENABLE ADHESIVE COMPOSITION CONTAINING DISPERSED NATURAL RUBBER FINE PARTICLES

(75) Inventor: Akira Hirasawa, Tokyo (JP)

(73) Assignee: Toppan Forms Co., Ltd., Tokyo (JP)

( * ) Notice: Subject to any disclaimer, the term of this patent is extended or adjusted under 35 U.S.C. 154(b) by 50 days.

(21) Appl. No.: 10/491,050

(22) PCT Filed: Mar. 26, 2003

(86) PCT No.: PCT/JP03/03692

§ 371 (c)(1),
(2), (4) Date: Mar. 29, 2004

(87) PCT Pub. No.: WO03/083001

PCT Pub. Date: Oct. 9, 2003

(65) Prior Publication Data

US 2005/0080181 A1    Apr. 14, 2005

(30) Foreign Application Priority Data

Mar. 28, 2002   (JP)   .............. 2002-091071
Mar. 28, 2002   (JP)   .............. 2002-091072
May 31, 2002    (JP)   .............. 2002-159469

(51) Int. Cl.
*C08K 3/20*   (2006.01)

(52) U.S. Cl. .............. 524/458; 524/502; 525/70

(58) Field of Classification Search ............... 524/458, 524/502; 525/70
See application file for complete search history.

(56) References Cited

U.S. PATENT DOCUMENTS 4,483,951 A    11/1984   Brenner et al.
6,210,517 B1   4/2001    Eadara et al.
6,294,598 B1   9/2001    Karmann et al.

FOREIGN PATENT DOCUMENTS

| EP | 0187044 A | 7/1986 |
|---|---|---|
| EP | 0349216 A | 1/1990 |
| JP | 1-292081 | 11/1989 |
| JP | 6-201746 | 7/1994 |
| JP | 06-207146 A | 7/1994 |
| JP | 6-220421 | 8/1994 |
| JP | 06-220421 A | 8/1994 |
| JP | 10-265752 A | 10/1998 |
| JP | 2000-017235 | 1/2000 |

*Primary Examiner*—Edward J. Cain
(74) *Attorney, Agent, or Firm*—Fitch, Even, Tabin & Flannery

(57) ABSTRACT

An adhesive composition comprising natural rubber based particles uniformly dispersed in a radiation setting compound is cured by radiation to make a pressure-sensitive adhesive layer on a substrate, thereby: sufficient adhesiveness is obtained; different fillers sufficiently charged; drying time after application is short; both overall application and pattern application are readily performed; application can be performed on different substrates; and sufficient adhesive strength between the substrate and the pressure-sensitive adhesive layer can be realizes. This adhesive composition may be manufactured by: mixing aqueous emulsion 31 containing the natural rubber based particles 30 and the radiation setting compound 32; elevating a temperature of the mixture while stirring; removing vaporized water in the aqueous emulsion; and replacing the water as the medium wherein the natural rubber based particles are dispersed with the radiation setting compound.

5 Claims, 4 Drawing Sheets

(a)

(b)

(c)

RADIATION HARDENABLE ADHESIVE COMPOSITION CONTAINING DISPERSED NATURAL RUBBER FINE PARTICLES

CROSS-REFERENCED APPLICATIONS

This application is the National Stage of International Application PCT/JP03/03692, filed Mar. 26, 2003, the complete disclosure of which is incorporated herein by reference, which designated the U.S. and that International Application was not published under PCT Article 21(2) in English.

TECHNICAL FIELD

The present invention relates to an adhesive composition which-has both advantages of a natural rubber based adhesive and those of a radiation setting medium as well as to a sheet for carrying information using it. More particularly, it relates to a sheet for carrying information which has concealability and confidentiality including folded sheets and layered sheets comprising a face as a face and carrying information which is layered by folding and cut-folding as well as a sheet for carrying information including office supplies such as size-extendable filing sheets and copying paper where the layered faces adhere.

BACKGROUND ART

Conventionally in the sheet carrying information is carried on the layered face, a pressure-sensitive adhesive layer is set on the layered face all over, partially or linearly in the pattern touching oppositely so that the layered sheets adhere each other, usually when layered. In this pressure-sensitive adhesive which is also referred to as self-adhering pressure-sensitive adhesive, each polymer adheres closely through self-diffusion or anchor effect by strong pressure exerted in the state where adhesive layers are touched oppositely each other, and perpetual adhesiveness or detachable adhesiveness is embodied depending on the composition type or degree of pressuring.

As an example of such sheets for carrying information, a postcard system and the like which have concealability and confidentiality have been made practicable becoming popular.

Examples of postcard systems include those where postcards carrying different information such as private business, copied and printed information are folded, cut-folded or where separate post cards are layered.

In these postcard systems, an adhesive layer is bonded by pressure detachably in different modes of layering to hide concealable and confidential information before mailed, then the hidden information is red by the recipient's detaching the layered face.

Further, other examples of postcard systems which have concealability and confidentiality include the one where an adhesive layer is bonded by pressure undetachably to confidential information before mailed, then the hidden information is red by the recipient's tearing off the adhering part and reopening the layered face.

Adhesive composition forms to be applied on the substrate of the sheet for carrying information such as concealable and confidential postcard systems described above include solution, aqueous solution, emulsion (latex), non-solvent and solid. Adhesive compositions in the form of aqueous solution and emulsion are generally aqueous while those in the form of solution, nonsolvent and solid are generally nonaqueous.

As aqueous pressure-sensitive adhesive compositions, emulsions of natural rubber latex are popular which have advantages including that they have high adhesive strength, different fillers may be added, they can be applied also on the high absorption substrate such as high quality paper. However, natural rubber emulsions are not suitable for pattern application where partial area is applied because viscosity of the emulsion is low, the applied part of the substrate contracts and so on, though overall application can be exerted easily. In addition, drying after application sometimes requires long time because the medium is water.

On the other hand, as nonaqueous pressure-sensitive adhesive compositions, radiation setting medium including acrylic ones are commonly used, for example, acrylic cured material which is cured by radiation such as an ultraviolet ray, electron ray, X-ray, I-ray and g-ray is used as a pressure-sensitive adhesive as described in Japanese Patent Laid-Open No. 10-265742. For such radiation setting pressure-sensitive adhesive compositions, there are advantages including that drying time after application is short, both overall and pattern application can be easily exerted. However, sometimes lacked adhesive strength and sufficient filler could not be added as well as they had sometimes difficulty when applied on high absorption substrate such as high quality paper because they were readily absorbed in the substrate.

Further, when two pressure-sensitive adhesive layers obtained from adhesive compositions described above were bonded by pressure, thereafter, when the pressure-sensitive adhesive layer bonded by pressure was detached, detachment between the substrate and the pressure-sensitive adhesive layer sometimes occurred resulting in damaging the information because adhesive strength between the substrate and the pressure-sensitive adhesive layer was insufficient.

DISCLOSURE OF THE INVENTION

In view of the above situation, the present invention aims to provide an adhesive composition wherein there is sufficient adhesive strength allowing sufficient filling of different fillers, drying time after application is short, both overall and pattern application can be easily exerted, application may be exerted on different substrates and sufficient adhesive strength between the substrate and the pressure-sensitive adhesive layer can be realized.

According to the present invention to achieve the above purposes, provided is an adhesive composition, comprising a natural rubber based particle uniformly dispersed in a radiation setting compound.

This adhesive composition can be manufactured by a method, comprising:

mixing an aqueous emulsion containing said natural rubber based particle with said radiation setting compound; and elevating a temperature of the mixture while stirring, removing vaporized water from the aqueous emulsion and replacing a water by said radiation setting compound as a medium wherein the natural rubber based particle are dispersed.

A pressure-sensitive adhesive layer consisting of a radiation setting material of the above adhesive composition is formed on a substrate sheet to manufacture a sheet for carrying information.

For this pressure-sensitive adhesive layer, there is sufficient adhesive strength allowing sufficient filling of different fillers, drying time after application is short, both overall and pattern application can be easily exerted, application may be exerted on different substrates and sufficient adhesive strength between the substrate and the pressure-sensitive adhesive layer can be realized.

Thus, application of the adhesive composition on the substrate to form the pressure-sensitive adhesive layer enables manufacturing of the sheet for carrying information such as secret and confidential information excellent in concealability.

BEST MODE FOR CARRYING OUT THE INVENTION

Figure 1:
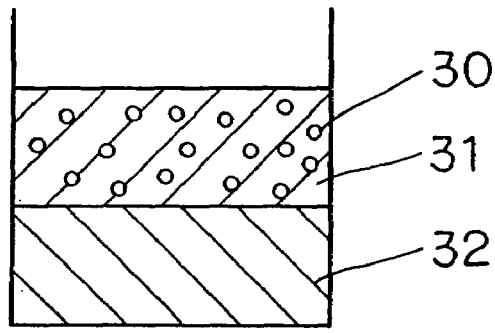
FIG. 1 is a schematic drawing illustrating a preparation method of an adhesive composition.
Figure 1:
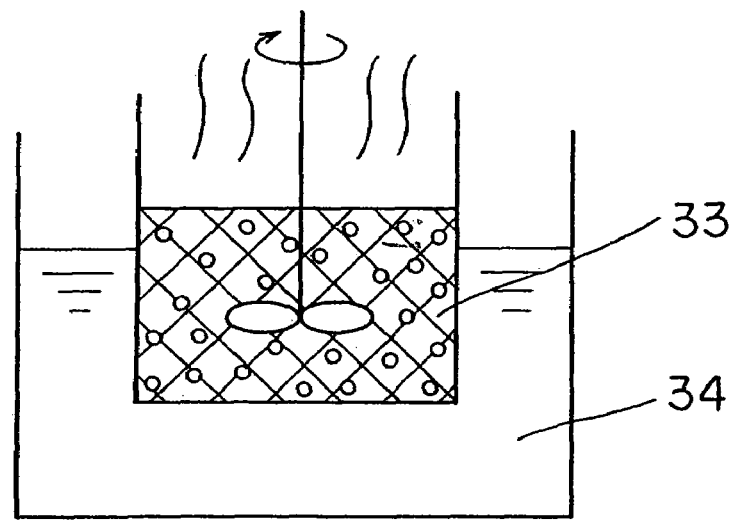
Figure 1:
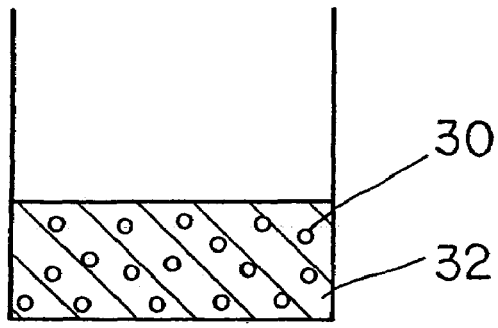

By adopting the manufacturing method of the present invention, water as a medium wherein natural rubber based particles are uniformly dispersed may be displaced with a radiation setting compound without damaging uniform dispersibility. This step is sometimes phase transition.

A radiation setting compound has radiation polymerizable functional groups and cured by radiation such as an ultraviolet ray, electron ray, X-ray, i-ray and g-ray. Therefore, the pressure-sensitive adhesive layer may be formed by applying the adhesive composition which contains a radiation setting compound as a nonaqueous adhesive composition on a substrate followed by curing with radiation such as an ultraviolet ray, electron ray, X-ray, i-ray and g-ray. Further, curing as described in the present invention is intended to include not only the one owing to formation of the network structure but also include lowering of fluidity following progressing of a polymerization reaction and the like.

The pressure-sensitive adhesive layer contains natural rubber based particles to realize uniform and high adhesiveness because natural rubber based particles are dispersed uniformly in the radiation setting compound. Further, when curing the radiation setting compound by radiation, it is considered that the radiation setting compound reacts with the natural rubber based particles. Thus, the natural rubber based particles may be fixed in the cured material of the radiation setting compound resulting in achievement of high adhesiveness.

Further, since the adhesive composition has sufficient pressure-sensitive adhesiveness, different fillers may be filled sufficiently as needed in the adhesive composition leading to realization of a wide range of characteristics of the adhesive composition.

Furthermore, the medium wherein the natural rubber based particles are dispersed is a nonaqueous radiation setting compound. Therefore, not only overall application but also pattern application can be done successfully because the adhesive composition has an appropriate viscosity as well as there is little contraction of the applied part of the substrate.

In addition, since the medium is a radiation setting compound, drying after application may be done quickly.

Further, the medium is a radiation setting compound, besides, it contains natural rubber based particles, therefore, it is easy to control the rate of the substrate absorbing the adhesive composition. Consequently, application can be done not only on the substrate with low absorption but also on the substrate with high absorption such as high quality paper.

Furthermore, when curing the radiation setting compound by a radiation, it is considered that the radiation setting compound absorbed in the substrate is cured in the substrate and that the radiation setting compound also reacts with the substrate. Therefore, adhesive strength between the substrate and the pressure-sensitive adhesive layer can be sufficiently realized, and when reading concealed information by detaching the pressure-sensitive adhesive layer bonded by pressure, detachment between the substrate and the pressure-sensitive adhesive layer can be controlled to prevent the concealed information from being damaged.

The adhesive composition wherein natural rubber based particles, as described above, are uniformly dispersed in the radiation setting compound is made to contain further a carboxyl group-containing acrylic compound, thereby performance of the pressure-sensitive adhesive layer obtained can be further improved.

In this case of the adhesive composition, the natural rubber based particles are uniformly dispersed in a radiation setting medium containing the carboxyl group-containing acrylic compound and the radiation setting compound.

The pressure-sensitive adhesive layer obtained from curing this adhesive composition by a radiation contains the natural rubber based particles and the carboxyl group-containing acrylic compound, thus, uniform and high adhesiveness can be realized because the natural rubber based particles are uniformly dispersed in the radiation setting medium. In addition, when curing the radiation setting medium by a radiation, it is considered that the radiation setting compound reacts with the natural rubber based particles. In this case, it is also considered that the carboxyl group-containing acrylic compound reacts with the radiation setting compound and the natural rubber based particles. Thus, the natural rubber based particles are firmly fixed in the cured material of the radiation setting medium, therefore, high adhesiveness may be realized. And the carboxyl group in the carboxyl group-containing acrylic compound is thought to be important for these excellent characteristics.

Furthermore, when curing the radiation setting medium containing the carboxyl group-containing acrylic compound by a radiation, it is considered that the radiation setting medium containing the carboxyl group-containing acrylic compound absorbed in the substrate is cured in the substrate. It is also considered that the radiation setting medium containing the carboxyl group-containing acrylic compound reacts with the substrate. Therefore, adhesive strength between the substrate and the pressure-sensitive adhesive layer can be sufficiently realized, and when reading concealed information by detaching the pressure-sensitive adhesive layer bonded by pressure, detachment between the substrate and the pressure-sensitive adhesive layer can be controlled to prevent the concealed information from being damaged.

The present invention will be further described in detail as follows.

Natural Rubber Based Particles

The natural rubber based particles are particles of natural rubber based rubber and the like being a main ingredient showing adhesive strength through pressure-bonding. For the natural rubber type rubber, there is no specific limitation on the natural rubber and others if they have an isoprene skeleton which is a main ingredient of the natural rubber as well as self adhesiveness similarly to the natural rubber.

However, in order to improve dispersibility and compatibility of the natural rubber based particles to the radiation setting medium, a copolymer of the natural rubber type rubber with an acrylic monomer is preferable as the natural rubber based particles.

The acrylic monomer may be (meth)acrylic esters such as methyl (meth)acrylate, ethyl (meth)acrylate, propyl (meth)acrylate, butyl (meth)acrylate, hexyl (meth)acrylate, octyl (meth)acrylate, 2-ethylhexyl (meth)acrylate, decyl (meth)acrylate, dodecyl (meth)acrylate, lauryl (meth)acrylate, lauryl-dodecyl (meth)acrylate, tridecyl (meth)acrylate, cetyl-stearyl (meth)acrylate, stearyl (meth)acrylate, cyclohexyl (meth)acrylate, benzyl (meth)acrylate, and phenyl (meth)acrylate; (meth)acrylic amides such as (meth)acrylic amide and (meth)acrylic methylolamide; reactive acrylic monomers such as (meth)acrylic acid, hydroxyethyl (meth)acrylate, hydroxypropyl (meth)acrylate, hydroxybutyl (meth)acrylate, dimethylaminoethyl (meth)acrylate, diethylaminoethyl (meth)acrylate, butylaminoethyl (meth)acrylate, glycidyl (meth)acrylate, and tetrahydrofurfuryl (meth)acrylate; crosslinking acrylic monomers such as ethylene di(meth)acrylate, diethylene glycol di(meth)acrylate, triethylene glycol di(meth)acrylate, tetraethylene glycol di(meth)acrylate, decaethylene glycol di(meth)acrylate, pentadecaethylene glycol di(meth)acrylate, pentacontahectaethylene glycol di(meth)acrylate, butylene di(meth)acrylate, allyl(meth)acrylate, trimethylolpropane tri(meth)acrylate, pentaerythritol tetra(meth)acrylate, and diethyleneglycol di(meth)acrylate phthalate, and the like, as well as combinations of two or more of them.

Further, in order to improve fixation of the adhesive composition to the substrate, in addition to improve dispersibility of the natural rubber based particles a copolymer of the natural rubber type rubber with a styrene based monomer is preferable as the natural rubber based particles.

The styrene based monomers may be styrene, α-methylstyrene, p-methylstyrene, α-methyl-p-methylstyrene, p-methoxystyrene, o-methoxystyrene, 2,4-dimethylstyrene, chlorostyrene, bromostyrene, and the like, as well as combinations of two or more of them.

From the above viewpoints, further there is sometimes a case that uses a copolymer of the natural rubber-rubber, the acrylic monomer and the styrene monomer as the natural rubber based particles. Furthermore, if necessary, combinations of two or more of natural rubber based particles may be used.

Radiation Setting Compound

For radiation setting compounds, there is no specific limitation if they can perform good medium-replacement and if they are cured well by a radiation. However, from the viewpoints of the medium-replacement property, curability and performance of pressure-sensitive adhesive layer obtained, a radiation setting acrylic compound and a cyclic ether-containing radiation setting compound are preferable, if necessary, those combinations also may be used.

As the radiation setting acrylic compound, an oligomer having at least one or more acryloyl or methacryloyl groups is preferable in view of realizing good performance of the adhesive composition and pressure-sensitive adhesive layer. Further, more preferred is an oligomer having at least two or more acryloyl or methacryloyl groups. Furthermore, in addition to these (meth)acryloyl groups, one may use an oligomer having simultaneously a radically reactive unsaturated groups. Such unsaturated groups may include an allyl group, a methallyl group and the like.

Although the type of oligomers is not specifically limited, the weight-average molecular weight is preferably 30–1,000, and used are an oligoethylene glycol, an epoxy resin oligomer, a polyester resin oligomer, a polyamide resin oligomer, an urethane resin oligomer, an oligovinyl alcohol, a phenol resin oligomer and the like.

Specific examples of the above radiation setting acrylic compounds include oligoethylene glycol di(meth)acrylate; nonyl phenol EO modified (n=4) acrylate; epoxy resin oligomer acrylic ester (for example, bisphenol A diglycidyl ether diacrylate); a reaction product of epoxy resin oligomer, acrylic acid, and methyltetrahydrophthalic anhydride; a reaction product of epoxy resin oligomer and 2-hydroxyethyl acrylate; a reaction product of epoxy resin oligomer diglycidyl ether and diallylamine; an open ring copolymer ester of glycidyl diacrylate and phthalic anhydride; an ester of methacrylic dimer and polyol; a polyester obtained from acrylic acid, phthalic anhydride, and propylene oxide; a reaction product of oligoethylene glycol, maleic anhydride, and glycidyl methacrylate; a reaction product of oligovinyl alcohol and N-methylolacrylamide; a product obtained by esterifying oligovinyl alcohol by succinic anhydride followed by addition of glycidyl methacrylate; an oligomer obtained by reacting diallyl ester of pyromellitic dianhydride with p,p'-diaminodiphenyl; a reaction product of a ethylene-maleic anhydride copolymer and allylamine; a reaction product of a methyl vinyl ether-maleic anhydride copolymer and 2-hydroxyethyl acrylate; a product obtained by further reacting the former product with glycidyl methacrylate; an urethane oligomer having an acryloyl group or a methacryloyl group on the opposite ends, of which oligooxy alkylene segment or saturated oligoester segment, or both of them are linked via an urethane bond; isoprene gum or butadiene gum with acryl-modified ends, and the like. Preferably the radiation setting acrylic compounds are oligoethylene glycol di(meth)acrylate and the like.

Further, if necessary, a photopolymerizable monomer may be used as a radiation setting acrylic compound. Preferable photopolymerizable monomers may be (meth)acrylic acid; (meth)acrylic-ester, for example, alkyl, cycloalkyl, halogenated alkyl, alkoxyalkyl, hydroxyalkyl, aminoalkyl, tetrahydrofurfuryl, allyl, glycidyl, benzyl; phenoxy acrylate; phenoxy methacrylate; alkylene glycol; mono- or diacrylate, and methacrylate of polyoxyalkylene glycol; trimethylolpropane triacrylate and methacrylate; pentaerythrite tetraacrylate and methacrylate and the like; acrylamide, methacrylamide, or the derivatives, for example, acrylamide and methacrylamide mono-substituted or di-substituted by an alkyl group or a hydroxyalkyl group; diacetone acrylamide and methacrylamide; N,N'-alkylenebisacrylamide and methacrylamide, and the like.

Further, for use in a case in which curing contraction is an obstraction, used are, for example, isobornyl acrylate or methacrylate; norbornyl acrylate or methacrylate; dicyclopentoxyethyl acrylate or methacrylate; dicyclopentenoxypropyl acrylate or methacrylate, and the like; an acrylic ester or a methacrylic ester of diethylene glycol dicyclopentenyl monoether; an acrylic ester or a methacrylic ester of oligooxyethylene or oligopropylene glycol dicyclopentenyl monoether, and the like; dicyclopentenyl cinnamate, dicyclopentenoxyethyl cinnamate, dicyclopentenoxyethyl monofumarate or difumarate, and the like; a mono- or diacrylate, or a mono- or dimethacrylate of 3,9-bis(1,1-bismethyl-2-oxyethyl)-spiro[5,5]undecane, 3,9-bis(1,1-bismethyl-2-oxyethyl)-2,4,8,10-tetraoxaspiro[5,5]undecane, 3,9-bis(2-oxyethyl)-spiro[5,5]undecane, 3,9-bis(2-oxyethyl)-2,4,8,10-tetraoxaspiro[5,5]undecane, and the like; a mono- or diacrylate, or a mono- or dimethacrylate of an addition polymer of ethyleneoxide or propyleneoxide of these spiroglycols; a methylether of these monoacrylates or methacrylates; 1-azabicyclo[2,2,2]-3-octenyl acrylate or methacrylate; bicyclo[2.2.1]-5-heptene-2,3-dicarboxyl monoallyl ester, and the like; dicyclopentadienyl acrylate or methacrylate; dicyclopentadienyl oxyethyl acrylate or methacrylate; dihydrodicyclopentadienyl acrylate or methacrylate, and the like.

Further, if necessary, multi-functional acrylic compounds may be also used as radiation setting acrylic compounds. As the multi-functional acrylic compounds, may be used a (meth)acrylic ester of a copolymerizable α,β-unsaturated polycarboxylic acid, a dimethacrylic acid alkylene glycol ester of dimethacrylic acid ethylene glycol, dimethacrylic acid 1,3-butylene glycol, dimethacrylic acid 1,4-butylene glycol, dimethacrylic acid propylene glycol and the like, trimethylol propane EO addition triacrylate and the like.

Further, if necessary, an acrylic monomer, an acrylic oligomer having 2–10 of polymerization degree, these mixtures and the like may be used together. In this case, preferred is an oligomer that can be obtained by vinyl polymerization of an acrylic monomer. Preferable examples of the acrylic monomers include (meth)acrylic esters such as methyl(meth)acrylate, ethyl(meth)acrylate, propyl(meth)acrylate, butyl(meth)acrylate, hexyl(meth)acrylate, octyl(meth)acrylate, 2-ethylhexyl(meth)acrylate, decyl(meth)acrylate, dodecyl(meth)acrylate, lauryl(meth)acrylate, lauryl-tridecyl(meth)acrylate, tridecyl(meth)acrylate, cetyl-stearyl(meth)acrylate, stearyl(meth)acrylate, cyclohexyl(meth)acrylate, benzyl(meth)acrylate, and phenyl methacrylate; (meth)acrylic amides such as (meth)acrylic amide and (meth)acrylic methylolamide; reactive acrylic monomers such as (meth)acrylic acid, hydroxyethyl(meth)acrylate, hydroxypropyl(meth)acrylate, hydroxybutyl(meth)acrylate, dimethylaminoethyl(meth)acrylate, diethylaminoethyl(meth)acrylate, butylaminoethyl(meth)acrylate, glycidyl(meth)acrylate, and tetrahydrofurfuryl(meth)acrylate; crosslinking acrylic monomers such as ethylene di(meth)acrylate, diethylene glycol di(meth)acrylate, triethylene glycol di(meth)acrylate, tetraethylene glycol di(meth)acrylate, tetraethylene glycol di(meth)acrylate, decaethylene glycol di(meth)acrylate, pentadecaethylene glycol di(meth)acrylate, pentacontahectaethylene glycol di(meth)acrylate, butylene di(meth)acrylate, allyl(meth)acrylate, trimethylolpropane tri(meth)acrylate, pentaerythritol tetra(meth)acrylate, and diethyleneglycol di(meth)acrylatephthalate, and the like. Two or more of these monomers, if necessary, maybe used together and also a mixture of oligomers having different polymerization degrees may be used.

Further, like paracumyl phenol EO-reformed (n=1) acrylate, those where an oligomer component of a radiation setting acrylic compound is substituted with a monomer component may be also used.

On the other hand, for the cyclic ether-containing radiation setting compound, in order to realize good performance of the adhesive composition and pressure-sensitive adhesive layer as well as of a ring-opening property of the cyclic ether structure, although there is no specific limitation on the cyclic ether-containing radiation setting compound, preferred are the cyclic ether-containing radiation setting compounds containing one or more cyclic ether structures which contain 2–12 carbons and 1–5 oxygen. Further, the number of carbons is more preferably not more than 6, still more preferably not more than 4, and the oxygen number is preferably not more than 4, more preferably not more than 2. The number of the cyclic ether structures is more preferably 2 or more.

More particularly, the cyclic ether structure is preferably the crosslinking structure including —O—, and preferably a compound with a group having an epoxy ring such as a glycidyl group.

Further, in addition to the cyclic ether structure, a compound having simultaneously a radically reactive unsaturated group may be also used. Such an unsaturated group can include an acryloyl group, methacryloyl group, allyl group, methallyl group, and the like.

Further, a group having the above cyclic ether structure and an unsaturated group preferably bond with a monomer component and an oligomer component in order to realize good performance of the adhesive composition and pressure-sensitive adhesive layer.

Although the type of oligomer components is not limited, the weight-average molecular weight is preferably 50–1,000, and used are an oligoethylene glycol, epoxy resin oligomer, polyester resin oligomer, polyamide resin oligomer, urethane resin oligomer, oligovinyl alcohol, phenol resin oligomer, and the like.

A compound wherein the cyclic ether structure bonds with these oligomer components may include, for example, oligoethylene glycol diglycidyl ether.

In addition, the type of monomer components is preferably a monomer of the oligomer component as described above, and a compound wherein the cyclic ether structure bonds with such a monomer component may include, for example, ethylene glycol diglycidyl ether as an example of two glycidyl groups while trimethylol propane tridiglycidyl ether as an example of three glycidyl groups.

Of the radiation setting compounds as described above, the one having two or three radiation polymerizable functional groups in a molecule is preferable and the one having two radiation polymerizable functional groups is more preferable in order to balance between polymerizablility of the pressure-sensitive adhesive composition and adhesiveness of the pressure-sensitive adhesive layer obtained. Further, if necessary, combinations of two or more of these radiation setting compounds also may be used. Furthermore, the radiation polymerizable functional group is a (meth)acryloyl group and the like when the radiation setting compound is a radiation setting acrylic compound, and an epoxy group when the radiation setting compound is a cyclic ether-containing radiation setting compound.

In order to realize the adhesive composition obtained and performance of the adhesive layer, the ratio of the radiation setting compound to 100 parts by weight of the natural rubber based particles is preferably not less than 50 parts by weight, more preferably not less than 80 parts by weight, still more preferably not less than 100 parts by weight, while it is preferably not more than 500 parts by weight, more preferably not more than 300 parts by weight, still more preferably 200 parts by weight. Further, if necessary, two or more radiation setting compounds also may be used together, and in this case, the total amount of radiation setting compounds is preferably within the above range.

Depending on the type of the radiation setting compounds used, a polymerization initiator is used together. Polymerization initiators may be, for example, benzoin, benzoin alkyl ethers such as benzoin ethyl ether, benzoin-n-propyl ether, benzoin-isopropyl ether, benzoin isobutyl ether; 2,2-dimethoxy-2-phenylacetophenone, benzophenone, benzyl, diacetyl, diphenylsulfide, eosin, thionin, 9,10-anthraquinone, 2-ethyl-9,10-anthraquinone, methyl benzoyl formate, and the like. These polymerization initiators may be used alone or in combination of two or more of them. The using amount should be 0.1–30 parts by weight to 100 parts by weight of the total amount of the radiation setting compound.

Acrylic Compound Containing Carboxyl Group

Although the acrylic compounds containing a carboxyl group are not specifically limited, in order to sufficiently improve initial adhesive strength while suppressing temporal increase of adhesiveness of a pressure-sensitive adhesive layer having sufficient strength, preferred are, for example, ester form (I) having a structure where epoxide(meth)acrylate having a hydroxyl group is bonded to a polycarboxylic acid by ester, ester form (II) having a structure where a hydroxy acid or hydroxy acid polymer is bonded to (meth) acrylic acid by ester, and (meth)acrylic polymer (III) having a carboxyl group.

The ester form (I) having a structure where the ester of epoxide(meth)acrylate having a hydroxyl group is bonded to a polycarboxylic acid by ester may be made, for example, as follows. First, performing ring-opening of the epoxide in the presence of (meth)acrylic acid, the ester is synthesized from (meth)acrylic acid and the epoxide. The ester obtained is thought to be a kind of alcohol where one hydroxyl group of the 1,2-diol forms an ester bond with (meth)acrylic acid and the other hydroxyl group has an unreacted structure, also thought to be a kind of β-hydroxy(meth)acrylate. These are also referred to as an olefin oxide-modified (meth)acrylic acid and an epoxide(meth)acrylate having a hydroxyl group or simply an epoxide(meth)acrylate.

Next, the epoxide(meth)acrylate obtained is made to react with a polycarboxylic acid to form an ester bond between a hydroxyl group of the epoxide(meth)acrylate and a carboxyl group of the polycarboxylic acid. In this case, by making at least one of two or more carboxyl groups of the polycarboxylic acid not react or by separating the unreacted one, the ester form (I) having a carboxyl group is obtained.

Alternatively, after the polycarboxylic acid derivatives such as the polycarboxylic acid and the anhydride are made to react with an epoxide and obtained is the ester form having a hydroxyl group derived from the epoxide and a carboxyl group derived from the polycarboxylic acid, the ester (I) having a structure similar to the one as described above may be obtained by forming an ester bond from this hydroxyl group and the carboxyl group of (meth)acrylic acid.

In order to sufficiently improve initial adhesive strength while suppressing temporal increase of adhesiveness of a pressure-sensitive adhesive layer having sufficient strength, although the epoxides are not specifically limited to, preferred are, for example, acyclic olefin oxides such as ethylene oxide, propylene oxide, 1,2-epoxy butane, 2,3-epoxy butane, 1,2-epoxy pentane, 2,3-epoxy pentane, 1,2-epoxy hexane, 2,3-epoxy hexane and 3,4-epoxy hexane; cyclic olefin oxides such as cyclohexene oxide and the like, and of them, preferred are acyclic olefin oxides such as ethylene oxide, propylene oxide and the like.

Further, in order to sufficiently improve initial adhesive strength while suppressing temporal increase of adhesiveness of a pressure-sensitive adhesive layer having sufficient strength, although polycarboxylic acids are not also specifically limited, preferred are, for example, saturated aliphatic dicarboxylic acids such as malonic acid, succinic acid, glutaric acid, adipic acid, pimelic acid, suberic acid, azelaic acid, sebacic acid, and the like; saturated aliphatic tricarboxylic acids such as hexane-2,3,5-tricarboxylic acid and the like; saturated cyclicaliphatic dicarboxylic acids such as hexahydrophthalic acid, hexahydroisophthalic acid, hexahydroterephthalic acid, and the like; saturated cyclic aliphatic tricarboxylic acids such as cyclohexane tricarboxylic acid and the like; unsaturated aliphatic dicarboxylic acids such as maleic acid, fumaric acid, and the like; unsaturated cyclic aliphatic dicarboxylic acids such as tetrahydro phthalic acid, tetrahydroisophthalic acid, tetrahydroterephthalic acid, and the like; aromatic dicarboxylic acids such as phthalic acid, isophthalic acid, terephthalic acid, naphthoic dicarboxylic acid and the like; aromatic tricarboxylic acids such as trimesic acid, trimellitic acid, naphthoic tricarboxylic acid, and the like.

Of them, preferred are saturated aliphatic dicarboxylic acids such as malonic acid, succinic acid, glutaric acid, adipic acid, pimelic acid, and the like; saturated cyclic aliphatic dicarboxylic acids such as hexahydrophthalic acid, hexahydroisophthalic acid, hexahydroterephthalic acid, and the like; aromatic dicarboxylic acids such as phthalic acid, isophthalic acid, terephthalic acid, naphthoic dicarboxylic acid and the like, and specifically preferred are saturated aliphatic dicarboxylic acids such as succinic acid and the like; saturated cyclic aliphatic dicarboxylic acids such as hexahydrophthalic acid and the like; and aromatic dicarboxylic acid such as phthalic acid.

As the ester (I) having the above structure, the following general formula (I) may be illustrated.

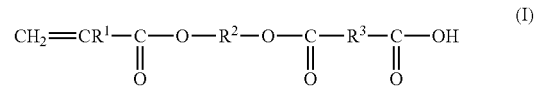

wherein $R^1$ is hydrogen or a methyl group; $R^2$ is alkylene which may contain a cyclic structure of 2–10 carbons; and $R^3$ is alkylene which may contain a cyclic structure of 1–20 carbons, alkenylene which may contain a cyclic structure of 1–20 carbons or arylene of 1–20 carbons.

Further, $R^2$ is derived from the above epoxides, preferably derived from the above preferable epoxides such as ethylene, propylene, and the like. $R^3$ is derived from the above polycarboxylic acids, preferably derived from the above preferable polycarboxylic acids such as ethylene, 1,2-cyclohexylene, o-phenylene and the like.

The ester form (II) having a structure where a hydroxy acid or hydroxy acid polymer is bonded with (meth)acrylic acid by ester may be made by, for example, ester formation through reaction of the hydroxy acid with (meth)acrylic acid, ester formation through reaction of lactone with (meth) acrylic acid, ester formation through reaction of a hydroxy acid polymer such as oligoester, polyester and the like with (meth)acrylic acid, oligoester and polyester formations through polycondensation of a hydroxy acid in the presence of (meth)acrylic acid, ester formation through reaction of oligoester and polyester obtained from ring-opening polymerization of lactone with (meth)acrylic acid, ring-opening polymerization of lactone in the presence of (meth)acrylic acid and the like.

The oligoester and polyester consisting of the hydroxy acid polymer are obtained from polycondensation of a hydroxy acid, and the polymerization degree of the hydroxy acid can be made to be the desired value by setting the reaction ratio as a prescribed value. And by forming an ester bond between a hydroxyl group of the hydroxy acid polymer obtained and a carboxyl group of (meth)acrylic acid, the ester form (II) is obtained.

When polycondensing a hydroxy acid in the presence of (meth)acrylic acid, the (meth)acrylic acid acts as a polymerization-stopping agent, and obtained is the ester form (II) wherein the (meth)acrylic acid is bonded by ester at the terminal of hydroxy groups of oligoester and polyester obtained by polycondensation of the hydroxy acid. In this case, the polymerization degree of the hydroxy acid may be made to be the desired value by setting the preparation ratio of the (meth)acrylic acid to the hydroxy acid as a prescribed value. For example, as increased the amount of the (meth)acrylic acid to that of the hydroxy acid, the polymerization degree of the hydroxy acid is reduced, while as reduced the amount of the (meth)acrylic acid to that of the hydroxy acid, the polymerization degree of the hydroxy acid may be increased.

Further, the oligoester and polyester consisting of the hydroxy acid polymer are obtained from ring-opening polymerization of lactone, and the polymerization degree of the hydroxy acid can be made to be the desired value by setting the reaction ratio as a prescribed value. And by forming an ester bond between a hydroxyl group of the lactone polymer obtained and a carboxyl group of (meth)acrylic acid, the ester form (II) is obtained.

Further, when polymerizing with ring-opening of lactone in the presence of (meth)acrylic acid, the (meth)acrylic acid acts as a polymerization-stopping agent, and obtained is the ester form (II) wherein the (meth)acrylic acid is bonded by ester at the terminal of hydroxy groups of oligoester and polyester obtained by ring-opening polymerization of the lactone. In this case, the polymerization degree of the lactone can be made to be the desired value by setting the preparation ratio of the (meth)acrylic acid to the lactone as a prescribed value. For example, as increased the amount of the (meth)acrylic acid to that of the lactone, the polymerization degree of the lactone is reduced, while as reduced the amount of the (meth)acrylic acid to that of the lactone, the polymerization degree of the lactone may be increased.

In order to sufficiently improve initial adhesive strength while suppressing temporal increase of adhesiveness of a pressure-sensitive adhesive layer having sufficient strength, the polymerization degree of the hydroxy acid and lactone is not less than 1 as the number-average polymerization degree, more preferably not less than 1.1, still more preferably not less than 1.2, while it is preferably not more than 5, more preferably not more than 4, still more preferably not more than 3.

Although hydroxy acids are not specifically limited, in order to sufficiently improve initial adhesive strength while suppressing temporal increase of adhesiveness of a pressure-sensitive adhesive layer having sufficient strength, preferred are, for example, a saturated aliphatic hydroxy acid such as glycolic acid, hydroxypropanoic acid, hydroxybutanoic acid, hydroxypentanoic acid, hydroxyhexanoic acid, hydroxyheptanoic acid, hydroxyoctanoic acid, hydroxynonanoic acid, hydroxydecanoic acid, hydroxydodecanoic acid, hydroxytetradecanoic acid, hydroxyoctadecanoic acid; a saturated cyclic aliphatic hydroxy acid such as hydroxycyclohexanecarboxylic acid; an aromatic hydroxy acid such as hydroxybenzoic acid, hydroxyphenylacetic acid, (hydroxyphenyl)propionic acid, hydroxytoluic acid, hydroxynaphthoic acid, and the like.

Of them, preferred are saturated aliphatic hydroxy acids such as hydroxypropanoic acid; saturated cyclic aliphatic hydroxy acids such as hydroxycyclohexane carboxylic acid; and aromatic hydroxy acids such as hydroxybenzoic acid.

Moreover, although lactones are not also specifically limited, in order to sufficiently improve initial adhesive strength while suppressing temporal increase of adhesiveness of a pressure-sensitive adhesive layer having sufficient strength, preferred are, for example, α-lactone, β-lactone, γ-lactone such as γ-caprolactone, δ-lactone such as δ-caprolactone, ε-lactone such as ε-caprolactone. Preferably the lactone is ε-caprolacton.

As ester form (II) having a structure as described above, the following general formula (II) may be illustrated.

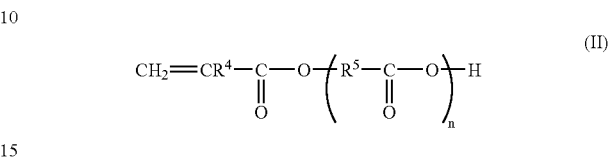

(II)

wherein n is an integer or a real number of 1–5; $R^4$ is hydrogen or a methyl group; $R^5$ is alkylene which may contain a cyclic structure of 1–20 carbons, alkenylene which may contain a cyclic structure of 1–20 carbons or arylene of 1–20 carbons.

Specifically when there is distribution of a polymerization degree of a repeat structure unit containing, $R^5$, n is intended to represent the number-average polymerization degree which is not always an integer. When n is 1, the ester form (II) is an ester form of a hydroxy acid with (meth)acrylic acid or an ester form of lactone with (meth)acrylic acid, while when n is greater than 1, it is an ester form of a hydroxy acid polymer such as oligoester, polyester and the like with (meth)acrylic acid or an ester form of a lactone polymer such as oligoester, polyester and the like with (meth)acrylic acid. When it is the ester form of the hydroxy acid polymer or the lactone polymer with (meth)acrylic acid, in order to sufficiently improve initial adhesive strength while suppressing temporal increase of adhesiveness of a pressure-sensitive adhesive layer having sufficient strength, n is greater than 1, more preferably not less than 1.1, still more preferably not less than 1.2, while it is preferably not more than 5, more preferably not more than 4, still more preferably not more than 3.

Herein, $R^5$ is derived from a hydroxy acid or lactone, preferably derived from the above preferable hydroxy acid or lactone such as ethylene, cyclohexylene, phenylene, pentamethylene, and the like.

(Meth)acrylic polymer (III) having a carboxyl group is obtained from polymerizing (meth)acrylic monomers such as (meth)acrylic acid, (meth)acrylate, these derivatives, and the like, if necessary, there is sometimes a case that a copolymer is manufactured in combination with two or more (meth)acrylic monomers to be used.

Although (meth)acrylic monomers are not specifically limited, in order to sufficiently improve initial adhesive strength while suppressing temporal increase of adhesiveness of a pressure-sensitive adhesive layer having sufficient strength, the (meth)acrylic monomer may be, for example, (meth)acrylic esters such as methyl (meth)acrylate, ethyl (meth)acrylate, propyl (meth)acrylate, butyl (meth)acrylate, hexyl (meth)acrylate, octyl (meth)acrylate, 2-ethylhexyl (meth)acrylate, decyl (meth)acrylate, dodecyl (meth)acrylate, lauryl (meth)acrylate, lauryl-dodecyl (meth)acrylate, tridecyl (meth)acrylate, cetyl-stearyl (meth)acrylate, stearyl (meth)acrylate, cyclohexyl (meth)acrylate, benzyl (meth)acrylate, and phenyl methacrylate; acrylic monomers having a carboxyl group such as (meth)acrylic acid; (meth)acrylic amides such as (meth)acrylic amide and (meth)acrylic methylolamide; reactive acrylic monomers such as hydroxyethyl (meth)acrylate, hydroxypropyl (meth)acrylate, hydroxybutyl (meth)acrylate, dimethylaminoethyl (meth) acrylate, diethylaminoethyl (meth)acrylate, butylaminoethyl (meth)acrylate, glycidyl (meth)acrylate, and tetrahydrofurfuryl (meth)acrylate; crosslinking acrylic monomers such as ethylene di(meth)acrylate, diethylene glycol di(meth)acrylate, triethylene glycol di(meth)acrylate, tetraethylene glycol di(meth)acrylate, decaethylene glycol di(meth)acrylate, pentadecaethylene glycol di(meth)acrylate, pentacontahectaethylene glycol di(meth)acrylate, butylene di(meth)acrylate, allyl (meth)acrylate, trimethylolpropane tri(meth)acrylate, pentaerythritol tetra(meth)acrylate, and diethyleneglycol di(meth)acrylate phthalate. Preferably the (meth)acrylic monomer is alkyl (meth)acrylate and (meth) acrylic acid.

Further, a monomer which is copolymerizable with the (meth)acrylic monomers as described above and introduces a monomer wherein a carboxyl group and a (meth)acryloyl group into the (meth)acrylic polymer (III) may be copolymerized. As a monomer introducing a carboxyl group, may be used alkenyl carboxylic acids such as vinyl acetate, allyl acetate, and the like; and alkenyl (meth)acrylates such as vinyl (meth)acrylate, allyl (meth)acrylate, and the like.

Further, a group having a carboxyl group at the terminal of the (meth)acrylic polymer (III) may be introduced and also a group having a (meth)acryloyl group may be introduced.

As the (meth)acrylic polymer (III) as described above, the following general formula (III) may be illustrated.

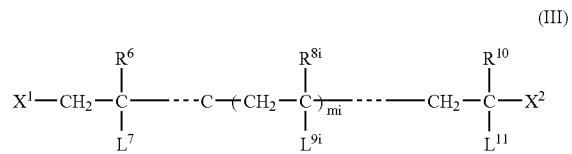

(III)

wherein $m_i$ is $m_1$–$m_l$ corresponding to one repeat structure unit; l is an integer of not less than 1; $m_i$ is independently each an integer or a real number of not less than 1; $R^6$, $R^{8i}$ and $R^{10}$ are independently each hydrogen or a methyl group; $L^7$ is a group containing a carboxyl group, a group containing a (meth)acryloyl group or —$CO_2R^7$ in which $R^7$ is hydrogen or a hydrocarbon group of 1–20 carbons; $L^{9i}$ is a group containing a carboxyl group, a group containing a (meth)acryloyl group or —$CO_2R^{9i}$ in which $R^{9i}$ is hydrogen or a hydrocarbon group of 1–20 carbons; $L^{11}$ is a group containing a carboxyl group, a group containing a (meth) acryloyl group or —$CO_2R^{11}$ in which $R^{11}$ is hydrogen or a hydrocarbon group of 1–20 carbons; $X^1$ and $X^2$ are independently each hydrogen, a group containing a carboxyl group or a group containing a (meth)acryloyl group; and any of $R^7$, $L^{9i}$ and $L^{11}$ does not contain a carboxyl group, or when any of $R^7$, $L^{9i}$ and $L^{11}$ is not hydrogen, at least one of either $X^1$ or $X^2$ contains a carboxyl group. Specifically when there is distribution of a polymerization degree of a repeat structure unit containing $L^{9i}$, $m_i$ is intended to represent the number-average polymerization degree which is not always an integer.

In order to sufficiently improve initial adhesive strength while suppressing temporal increase of adhesiveness of a pressure-sensitive adhesive layer having sufficient strength, the weight-average molecular weight is preferably not less than 1,000, more preferably not less than 1,500, while it is preferably not more than 10,000, more preferably not more than 5,000.

Specific examples of carboxyl group-containing acrylic compounds as described above may include those which have: a main chain skeleton having a low glass transition temperature; a carboxyl group in a molecule, at least any one of a (meth)acryloyl group and a carboxyl group on at least any of a molecular terminal and a side chain, a main chain skeleton consisting of a copolymer of an ethyl(meth)acrylate and a lauryl(meth)acrylate, a carboxyl group on at least any of a molecular terminal and a side chain, and the like such as the copolymerized ones of two or more of: ethylene oxide-modified succinic acid (meth)acrylate ($CH_2$=CH—CO—O$C_2H_4$O—CO—$C_2H_4$—$CO_2H$, $CH_2$=C$CH_3$—CO—O$C_2H_4$O—CO—$C_2H_4$—$CO_2H$), 2-(meth)acryloyloxyethyl phthalate ($CH_2$=CH—CO—O$C_2H_4$O—CO-φ-$CO_2H$, $CH_2$=C$CH_3$—CO—O$C_2H_4$O—CO-φ-$CO_2H$ wherein φ is a 1,2-phenylene group), 2-(meth)acryloyloxyethyl tetrahydrophthalate, 2-(meth)acryloyloxyethyl hexahydrophthalate ($CH_2$=CH—CO—O$C_2H_4$O—CO-ch-$CO_2H$, $CH_2$=C$CH_3$—CO—O$C_2H_4$O—CO-ch-$CO_2H$ wherein ch is a 1,2-cyclohexylene group), 2-(meth)acryloyl oxypropyl phthalate ($CH_2$=CH—CO—O$C_3H_6$O—CO-φ-$CO_2H$, $CH_2$=C$CH_3$—CO—O$C_3H_6$O—CO-φ-$CO_2H$ wherein φ is a 1,2-phenylene group), as preferable ester form (I); β-carboxyethyl(meth)acrylate ($CH_2$=CH(CO—O$C_2H_4$)$_n$$CO_2H$, $CH_2$=C$CH_3$(CO—O$C_2H_4$)$_n$$CO_2H$ wherein n is 1.5–3.0), (meth)acryloyl oligoester ($CH_2$=CH—CO—O($C_2H_4$—$CO_2$)$_n$H, $CH_2$=C$CH_3$—CO—O($C_2H_4$—$CO_2$)$_n$H wherein n is 1.1–1.7), ω-carboxypolycaprolactone mono(meth)acrylate ($CH_2$=CH—CO—O($C_5H_{10}$—$CO_2$)$_n$H, $CH_2$=C$CH_3$—CO—O($C_5H_{10}$—$CO_2$)$_n$H wherein n is 1.5–3.0), as preferable ester form (II); and ethyl(meth)acrylate, butyl(meth)acrylate, 2-ethylhexyl (meth)acrylate and lauryl(meth)acrylate as (meth)acrylic polymer (III).

Further, if necessary, two or more of carboxyl acid-containing acrylic compounds as described above may be used together.

An addition amount of the carboxyl acid-containing acrylic compound is set carefully considering performance of the obtained adhesive composition and adhesive layer: to 100 parts by weight of a radiation setting compound, preferably not less than 1 part by weight, more preferably not less than 3 parts by weight, and still more preferably not less than 5 parts by weight, while it is preferably not more than 80 parts by weight, more preferably not more than 30 parts by weight, and still more preferably not more than 10 parts by weight.

Adhesive Composition

Using natural rubber based particles as described above and a radiation setting medium such as a radiation setting acrylic compound (hereinafter, if necessary, also referred to as the first acrylic compound) as described above and a radiation setting compound containing cyclic ether, a method for preparing an adhesive composition will be described using FIG. 1.

First, as shown in FIG. 1(a), to radiation setting medium 32 is added aqueous emulsion 31 containing 40–80 wt % of natural rubber based particles 30.

This is mixed and the mixture 33 is heated using, for example, warm bath 34 as shown in FIG. 1(b). By heating, water which is an aqueous emulsion medium is vaporized to be gradually removed out of the mixture. And as water reduced, the water as the dispersion medium is replaced with the radiation setting medium (FIG. 1(c)).

When doing this method actually, as water reduces, viscosity of the mixture increases, while when the dispersion medium is replaced, viscosity of the mixture is suddenly reduced. Change of such sudden change of viscosity is thought to be caused by phase transition, and by adopting this method, an adhesive composition wherein natural rubber based particles are dispersed sufficiently and uniformly may be obtained without generating cohesion of the natural rubber based particles, and the like.

Further, in addition to dispersibility of the natural rubber based particles, the natural rubber based particles having a desired average particle diameter may be realized from the viewpoint of performance of the adhesive composition obtained and adhesive layer. Herein, the average particle diameter of the natural rubber based particles is preferably not less than 0.01 µm, more preferably not less than 0.03 µm, still more preferably not less than 0.05 µm, while it is preferably not more than 5 µm, more preferably not more than 1 µm, still more preferably not more than 0.5 µm. The average particle diameter is measured based on the weight standard using the light scattering method and the like.

Further, when adopting the method as described above, the dispersing medium may be directly replaced without either removing water of the medium from aqueous emulsion containing the natural rubber based particles or drying the natural rubber based particles. As a result the water content of the adhesive composition obtained may be sufficiently lowered, particularly not more than 10 wt %, more preferably not more than 5 wt %, and still more preferably not more than 1 wt %.

In order to obtain the adhesive composition wherein the natural rubber based particles having the desired average particle diameter are dispersed sufficiently and uniformly and the water content is sufficiently low, the mixing ratio of the aqueous emulsion containing the natural rubber based particles to the radiation setting medium should be carefully selected. Particularly, to 100 parts by weight of the aqueous emulsion containing the natural rubber based particles, the ratio of the radiation setting medium is set as preferably not less than 25 parts by weight, more preferably not less than 40 parts by weight and still more preferably not less than 50 parts by weight, while it is set as preferably not more than 250 parts by weight preferably not more than 150 parts by weight and still preferably not more than 100 parts by weight.

From the similar viewpoint, to 50 parts by weight of the natural rubber based particles, the ratio of the radiation setting medium is set as preferably not less than 25 parts by weight, more preferably not less than 40 parts by weight and still more preferably not less than 50 parts by weight, while it is set as preferably not more than 250 parts by weight, preferably not more than 150 parts by weight and still preferably not more than 100 parts by weight.

Further, in order to obtain the adhesive composition wherein the natural rubber based particles having the desired average particle diameter are dispersed sufficiently and uniformly and the moisture content is sufficiently low, a vaporizing temperature of moisture in the aqueous emulsion containing the natural rubber based particles should be carefully selected. Particularly, it is preferably not less than 20° C., more preferably not less than 30° C. and still more preferably not less than 40° C., while it is preferably not more than 70° C., more preferably not more than 60° C. and still more preferably not more than 50° C.

Furthermore, in order to obtain the adhesive composition wherein the natural rubber based particles having the desired average particle diameter are dispersed sufficiently and uniformly and the water content is sufficiently low in a sufficient productivity, a vaporizing method of the moisture content in the aqueous emulsion containing the natural rubber based particles should be carefully selected. Particularly, by sending a warm current of air, reducing in vacuo and the like, the vaporized moisture is forcibly removed to complete a replacement with the dispersing medium in about 30 min to 5 hrs.

When using a copolymer of natural rubber type rubber with at least either an acrylic monomer or a styrene monomer, the copolymer is synthesized prior to replacement with the above dispersing medium.

Such a copolymer may be synthesized by adding either an acrylic monomer or a styrene monomer into natural rubber emulsion, followed by vinyl polymerization of either the acrylic monomer or the styrene monomer in the natural rubber emulsion.

In this case, the reaction ratio of the natural rubber based particles to the acrylic monomer and the styrene monomer is set within a range of 1–80 parts by weight of the acrylic monomer and the styrene monomer to 100 parts by weight of the natural rubber based particles. As a polymerization initiator may be used, for example, those of organic peroxides, preferably redox initiators consisting of organic peroxides and ethylene diamines, and of them, preferred are redox initiators consisting of t-butylhydroperoxide (t-BHPO) and tetraethylene pentaamine (TEPA). As the organic peroxides, preferred are ketone peroxides, diacyl peroxides, dialkyl peroxides, peroxyketals, peroxyesters, peroxycarbonates, and the like, and as ethylene diamines, preferred are ethylene diamine (EDA), diethylene triamine (DETA), tetraethylene teraamine (TETA), pentaethylenehexamine (PEHA), and the like.

The using amount of polymerization initiations is within a range of 0.01–10 parts by weight to 100 parts by weight of natural rubber based particles.

Further, if necessary, added may be an adhesion-giving agents such as terpene resins, rosin, oil-solublephenol resins, chroman indene resins, petroleum hydrocarbon resins, terpene resin derivatives, rosin derivatives, oil-soluble phenol resin derivatives, chroman indene resin derivatives, petroleum hydrocarbon resin derivatives, and the like.

An emulsion obtained immediately after synthesizing a copolymer as described above contains unreacted monomer and the like besides the copolymer, however, without purification of the copolymer, a radiation setting medium may be mixed into the emulsion immediately after its synthesis followed by being replaced with a dispersing medium.

Moreover, after replaced with the dispersing medium, if necessary, the second acrylic compound is added. By using the second acrylic compound together, applicability of the adhesive composition may be controlled in a wider range, higher adhesiveness of the adhesive layer obtained may be realized and higher adhesive strength between the adhesive layer and the substrate may be realized.

From such a viewpoint, as the second acrylic compound, preferred are acrylic monomers, or acrylic monomers with 2–10 of the polymerization degree, or these mixtures, more particularly, preferred are oligomers obtained from vinyl polymerization of acrylicmonomers, and as the acrylicmonomers, preferred are: (meth)acrylic acid esters such as methyl(meth)acrylate, ethyl(meth)acrylate, propyl(meth)acrylate, octyl(meth)acrylate, 2-ethylhexyl(meth)acrylate, decyl(meth)acrylate, dodcyl(meth)acrylate, lauryl(meth)acrylate, lauryl-tridecyl(meth)acrylate, tridecyl(meth)acrylate, cetyl-stearyl(meth)acrylate, stearyl(meth)acrylate, cyclohexyl(meth)acrylate, benzyl(meth)acrylate, phenyl (meth)acrylate, and the like; (meth)acrylic acid amides such as (meth)acrylic acid amide, (meth)acrylic acid methylolamide, and the like; reactive acrylic monomers such as (meth)acrylic acid, hydroxyethyl(meth)acrylate, hydroxypropyl(meth)acrylate, hydroxybutyl(meth)acrylate, dimethylaminoethyl(meth)acrylate, diethylaminoethyl(meth) acrylate, butylaminoethyl(meth)acrylate, glycidyl(meth) acrylate and tetrahydrofufuryl(meth)acrylate, and the like; and crosslinking acrylic monomers such as ethylene di(meth)acrylate, diethylene glycol di(meth)acrylate, triethylene glycol di(meth)acrylate, tetraethylene glycol di(meth) acrylate, decaethylene glycol di(meth)acrylate, pentadecaethylene glycol di(meth)acrylate, pentacontahectaethylene glycol di(meth)acrylate, butylene glycol di(meth)acrylate, allyl di(meth)acrylate, trimethylolpropane tri(meth)acrylate, pentaerythritol tetra(meth)acrylate, and diethylene glycol di(meth)acrylate phthalate, and the like. Two or more of these monomers, if necessary, may be used together, and a mixture of oligomers having different polymerization degrees may be also used.

Further, the radiation setting first acrylic compound may be used as the second acrylic compound. In this case, like paracumyl phenol EO-reformed (n=1) acrylate, those where an oligomer component of the radiation setting first acrylic compound is substituted with a monomer component may be also used.

Further, an addition amount of the second acrylic compound is carefully set considering performance of the obtained adhesive composition and adhesive layer: to 100 parts by weight of the radiation setting first compound, preferably not less than 1 part by weight, more preferably not less than 3 parts by weight, and still more preferably not less than 5 parts by weight, while it is preferably not more than 80 parts by weight, more preferably not more than 30 parts by weight, and still more preferably not more than 10 parts by weight.

When adding a carboxyl group-containing acrylic compound, it may be added into a radiation setting medium prior to a replacement step of a dispersing medium.

Particularly, an adhesive composition wherein natural rubber based particles are uniformly dispersed in a radiation setting compound and a carboxyl group-containing acrylic compound is contained may be manufactured by a method including steps of:

mixing an aqueous emulsion containing the natural rubber based particles and the radiation setting compound;

elevating a temperature of the mixture while stirring, vaporizing water of the aqueous emulsion to be removed, and replacing the water as the medium where the natural rubber based particles are dispersed with the radiation setting compound; and adding the carboxyl group-containing acrylic compound into the replaced material.

If the carboxyl group-containing acrylic compound is pre-added into the radiation setting compound as described above, adjustments of viscosity of the radiation setting compound and the like may be extensively performed, therefore, replacement of the dispersing medium may be conducted with good workability.

On the other hand, after replacing the dispersing medium, the carboxyl group-containing acrylic compound may be added into the radiation setting medium.

Particularly, it may be manufactured by a method including steps of:

mixing an aqueous emulsion containing the natural rubber based particles and the radiation setting medium containing the carboxyl group-containing acrylic compound and the radiation setting compound; and elevating a temperature of the mixture while stirring, vaporizing water of the aqueous emulsion to be removed, and replacing the water as the medium where the natural rubber based particles are dispersed, with the radiation setting compound.

Described above when adding the carboxyl group-containing acrylic compound after replacement of the dispersed medium, thereby deterioration of the carboxyl group-containing acrylic compound during the replacement step may be prevented.

In addition, a part of the carboxyl group-containing acrylic compound may be pre-added into the radiation setting medium, then the further carboxyl group-containing acrylic compound may be added after replacement of the dispersing medium.

When forming the adhesive layer after replacement of the dispersing medium, if necessary, a polymerization initiator is added to cure the radiation setting medium.

Moreover, in order to improve adhesiveness of the adhesive layer obtained and fixation of the adhesive layer onto the substrate, there is sometimes a case that adds styrene-butadiene rubber latex. The styrene-butadiene rubber latex is thought to improve adhesion between the substrate applied with the adhesive composition and the natural rubber based particles.

The styrene-butadiene rubber latex consists of mainly styrene-butadiene rubber (SBR), and as SBR may be used emulsion polymerization SBR such as SBR driver and SBR latex; and solution polymerization SBR and the like such as random SBR, block SBR and symmetrical block SBR.

Further, characteristics of SBR depend significantly on the copolymer ratio of styrene and butadiene. From such a viewpoint, those where the styrene content is low (not more than 30 wt %), the styrene content is moderate (more than 30 wt % to not more than 70 wt %), the styrene content is high (over 70 wt %) are carefully selected to be used for the styrene-butadiene rubber latex.

SBR used as a main component of the styrene-butadiene rubber latex may include a non-modified type, a vinylpyridine modified type and a carboxy modified type, and the like. Of them, preferred is carboxy modified styrene-butadiene rubber latex because it is excellent in adhesion to a substrate and adhesiveness between the natural rubber based particles and the substrate may be sufficiently improved.

In order to sufficiently improve adhesiveness of the natural rubber based particles, the mixing ratio of the styrene-butadiene rubber latex to the natural rubber based particles is preferably not less than 1 part by weight, more preferably not less than 5 parts by weight of the styrene-butadiene rubber latex to 100 parts by weight of the natural rubber based particles. On the other hand, in order not to lose other characteristics of the natural rubber based particles, the ratio is preferably not more than 50 parts by weight, more preferably not more than 30 parts by weight and still more preferably not more than 20 parts by weight.

Also, since sufficient interaction between the adhesive layer obtained and printing agents including ink and toner, etc. may be realized by setting the content of the styrene-butadiene rubber latex as an appropriate value, sufficient fixation of the printing agents may be realized. Further, since adhesive strength after pressing adhesion layer may be made to be appropriate, detachment of the adhesive layer at unnecessary time after pressuring adhesion may be suppressed, while if necessary, the adhesive layer may be readily detached at desired time after pressing adhesion.

Further, in order to realize sufficient blocking resistance of the pressure-sensitive adhesive composition obtained, preferably a filler which is non-affinitive to the natural rubber based particles is added into the adhesive composition. Since unevenness on the surface of the adhesive layer (adhesive surface) is formed by addition of the filler, suppressed is adhesion of the adhesive surface to the other surface prior to pressing adhesion on the adhesive surface, and it is thought to improve blocking resistance.

In addition, if unevenness on the surface of the adhesive layer (adhesive surface) is formed by addition of the filler, melt adhesion between the adhesive surfaces after pressing adhesion proceeds and it is considered that temporal increase of adhesiveness may be suppressed. As these results, if it is necessary to detach the adhesive surface after pressing adhesion, the adhesive surface may be readily detached.

Also, if it is necessary to become so as not to inhibit transparency of the adhesive layer, preferred are those wherein the particle form as a filler is regularly arranged. Such materials include, for example, different silica fillers, different starch fillers, synthetic zeolite, microspherical (meth)acrylic resins, microspherical polyethylene, spherical alumina, glass powder, silus balloon, activated clay, titanium oxide and zinc oxide, and the like. These fillers may be used alone or in combination with two or more of them.

Herein, the average particle diameter of these fillers is preferably not less than 0.01 μm and more preferably not less than 1 μm, while it is preferably not more than 35 μm and more preferably not more than 25 μm. Further, when using in combination with two or more of different particle diameters, its combination is likely to unevenly form the surface of the adhesive layer and therefore advantageous to blocking resistance and improvement of detachment performance.

Of the above fillers, the silica filler and starch filler are preferable because they have less affinity to the natural rubber based particles and may realize sufficient blocking resistance.

In case of the silica filler, to 100 parts by weight of the natural rubber based particles, a combination amount of the filler is preferably not less than 10 parts by weight, more preferably not less than 20 parts by weight, and still more preferably not less than 30 parts by weight, while it is preferably not more than 100 parts by weight, more preferably not more than 80 parts by weight, and still more preferably not more than 60 parts by weight.

Also, in case of the starch filler, to 100 parts by weight of the natural rubber based particles, a combination amount of the filler is preferably not less than 10 parts by weight, more preferably not less than 20 parts by weight, and still more preferably not less than 30 parts by weight, while it is preferably not more than 200 parts by weight, more preferably not more than 180 parts by weight, and still more preferably not more than 160 parts by weight.

In addition to the above additives, in order to improve ultraviolet resistance, there is sometimes a case where an ultraviolet absorbing agent (ultraviolet absorbent) is added into the adhesive composition.

Such ultraviolet absorbents may include: salicylic acids such as phenyl salicylate, butylphenyl salicylate, octylphenyl salicylate, and the like; benzophenones such as dihydroxybenzophenone, hydroxymethoxybenzophenone, hydroxyocthoxybenzophenone, hydroxydodecyloxybenzophenone, hydroxymethoxysulfobenzophenone, bis(methoxyhydroxybenzoylphenyl)methane, and the like; benzotriazoles such as (hydroxymethylphenyl)benzotriazole, (hydroxybutylphenyl)benzotriazole, (hydroxydibutylphenyl)benzotriazole, (hydroxybutylmethylphenyl)chlorobenzotriazole, (hydroxydibutylphenyl)chlorobenzotriazole, (hydroxydiamylphenyl)benzotriazole and [hydroxy(tetrahydrophthalimidemethyl)methylphenyl]bennzotriazole, and the like; cyanoacrylates such as ethylhexylcyanodiphenyl acrylate, ethylcyanodiphenyl acrylate, and the like; and hindered amins and the like.

Also, there is sometimes a case that needs antioxidants. As the antioxidants may be used: amines including aromatic secondary amines such as amine-ketones, diphenylamines, diaryl-P-phenylenediamins, alkylaryl-P-phenylenediamines, and the like; phenols including monophenols, bisphenols and hydroquinones; organic sulfurs; phosphites; and these complex systems, and the like, of them, phenols are preferable because they give less pollution and coloration.

Furthermore, the adhesive composition, if necessary, may be made in combination with synthetic rubber emulsions. The synthetic rubber emulsions may illustrate emulsions dispersed in aqueous solvents with synthetic rubber such as polyisobutylene rubber, polybutadiene rubber, acrylonitrile-butadiene rubber, methyl methacrylate-butadiene rubber, chloroprene rubber, butyl rubber, polyurethane rubber, thiocoal rubber and acrylic rubber, and the like.

The adhesive composition may be made also in combination with synthetic resin emulsions. The synthetic resin emulsions may illustrate vinyl polyacetate emulsions, vinyl acetate-ethylene copolymer emulsions, polyacrylic acid ester emulsions and vinyl polychloride emulsions, and the like. Herein, of these synthetic resin emulsions, those wherein the glass transition temperature (Tg) is −30 to 20° C. are suitable.

Emulsifiers maybe added in order to stabilize dispersion of the natural rubber based particles. Such emulsifiers may use anionic and nonionic surfactants such as rosin soap, naphthalene sulfonic acid salts, aliphatic acid soap and alkylbenzene sulfonic acid salts, and the like.

Furthermore, if necessary, to the adhesive composition may be mixed pH adjusting agents, antioxidants, adhesive-giving agents, viscosity adjusting agents, rubber antioxidants, stabilizers and coloring agents, and the like.

Sheet for Carrying Information

The adhesive composition obtained such as described above is applied on a substrate using application means of a photogravure coater, a flex, an air knife coater, a wire bar and a bar coater, and the like, to form a film.

Further, the substrate has forms such as a sheet form, and may use besides usual paper, synthetic films such as synthetic paper, polyethylene, polyethylene terephthalate, polypropylene and vinyl chloride, and the like. When using these synthetic films, preferably performed is surface treatment such as mat treatment and corona treatment, the like on the surface of a substrate sheet.

Also, in order to maintain adhesion, detachment and transparency, an application amount of the adhesive composition onto the sheet surface of the substrate is preferably not less than 1 g/m$^2$, more preferably not less than 3 g/m$^2$ and still more preferably not less than 4 g/m$^2$, while it is preferably not more than 30 g/m$^2$, more preferably not more than 20 g/m$^2$ and still more preferably not more than 7 g/m$^2$.

Figure 2:
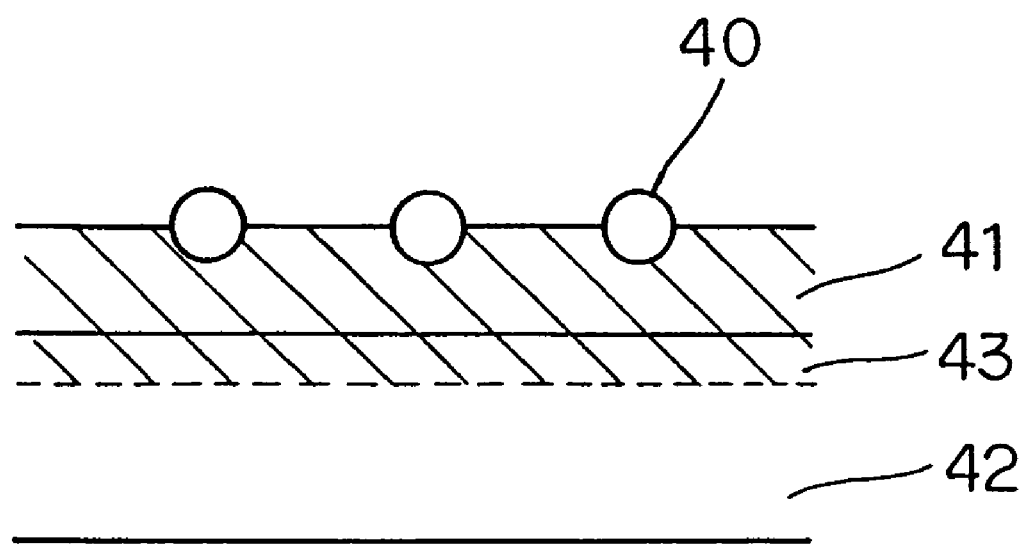
FIG. 2 is a schematic drawing to illustrate an adhesive layer.

A film consisting of the adhesive composition is cured by irradiating radiation. As a result, as shown in FIG. 2, the pressure-sensitive adhesive layer is formed on the sheet of substrate 42, and the pressure-sensitive adhesive layer may give a sheet for carrying information which is radiation cured material 41 of the radiation setting medium wherein natural rubber based particles 40 are dispersed. Further, it is considered that a part of the radiation setting medium which is a dispersing medium is dispersed in the substrate before curing. As shown in 43, it is considered that a part of the radiation setting medium is cured in the substrate or reacted with the substrate by irradiating radiation. As a result, high adhesive strength between the adhesive layer and the substrate may be realized.

Also, the film, if necessary, is dried before curing, however, during the curing process by irradiation of radiation, the drying proceeds simultaneously. Since the dispersing medium is the radiation setting medium, the drying may be completed in a short time or there is sometimes a case that does not need separately the drying process.

Figure 3:
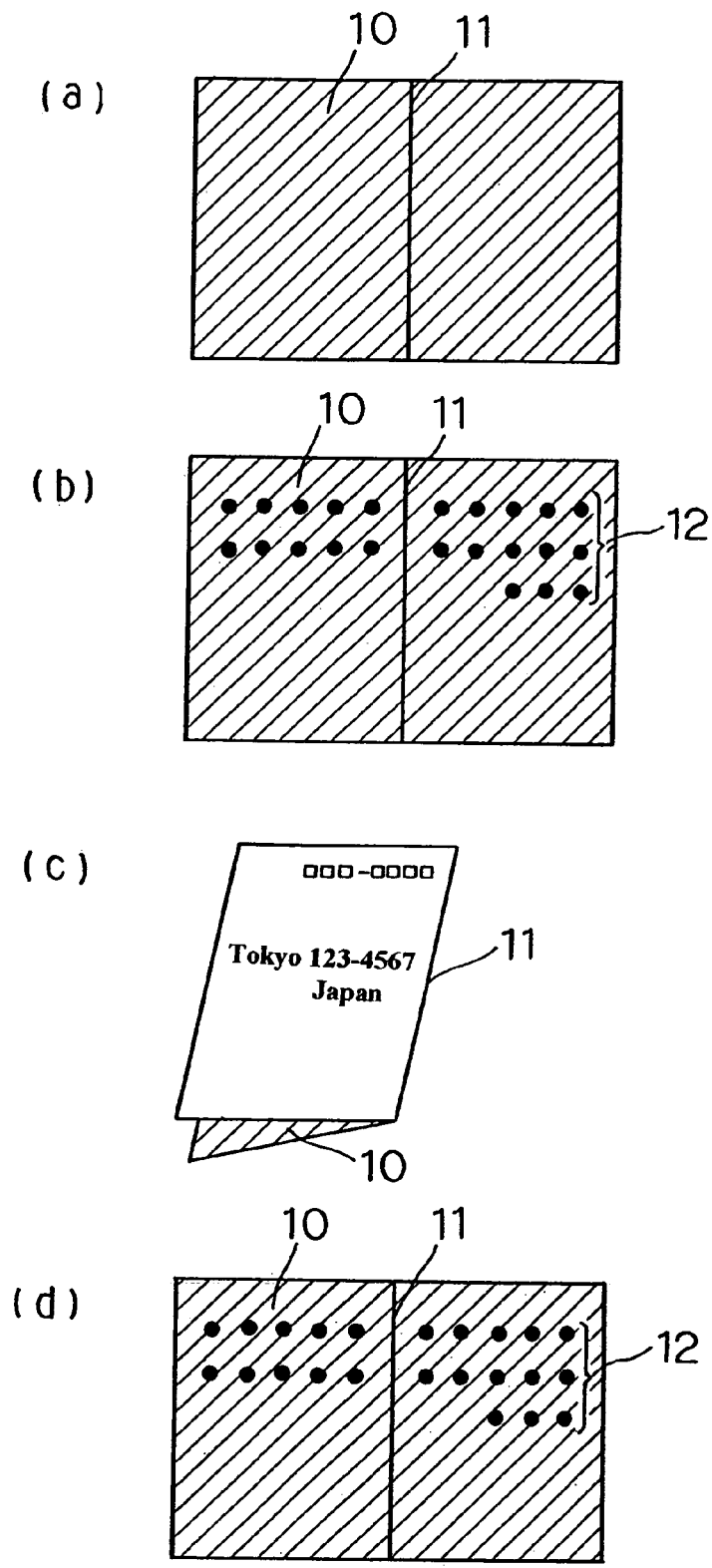
FIG. 3 is a schematic drawing to illustrate a sheet for carrying information where an adhesive layer is detectable.
Figure 4:
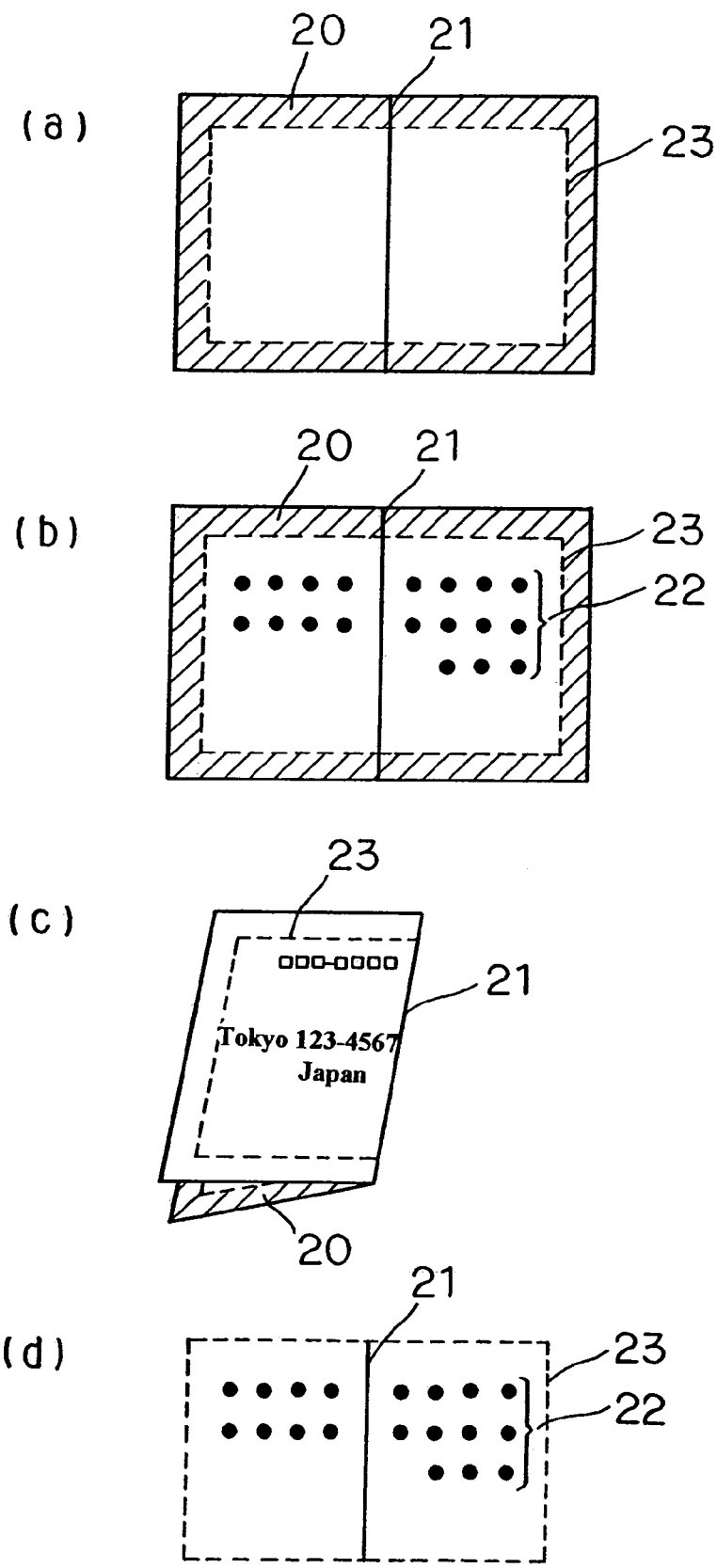
FIG. 4 is a schematic drawing to illustrate a sheet for carrying information where an adhesive layer is undetectable.

Herein, examples wherein the adhesive layer is a detachable sheet for carrying information and the adhesive layer is an undetachable sheet for carrying information are shown in FIG. 3(*a*) and FIG. 4(*a*), respectively.

In case of FIG. 3(*a*), as shown in FIG. 3(*b*), information 12 such as concealment and confidentiality and the like is printed on adhesive layer 10. Thereafter, as shown in FIG. 3(*c*), the sheet for carrying information is folded down at folding line 11 so that the adhesive layer 10 is layered, then pressing adhesion is performed on adhesive layer 10. And as shown in FIG. 3(*d*), when necessary, adhesive layer 10 is detached to read information 12. In this case, the adhesive layer is required for being readily detachable at desired time after pressing adhesion. Further, the adhesive composition is applied overall.

On the other hand, in case of FIG. 4(*a*), as shown in FIG. 4(*b*), information 22 of concealment and confidentiality is printed at the position without forming of adhesive layer 20. Thereafter, as shown in FIG. 4(*c*), the sheet for carrying information is folded down at folding line 21 so that adhesive layer 10 is layered, then pressing adhesion on adhesive layer 20. And as shown in FIG. 4(*d*), reading of information 22 without detaching adhesive layer 20 is performed by cutting the prescribed position (for example, perforating line 23 of the substrate sheet and the like. In this case, the adhesive layer is required for not being detached substantially after pressing adhesion. Further, the adhesive composition is applied in pattern.

Also, by changing a combination ratio of the material comprising the pressure-sensitive adhesive composition and the pressing adhesion condition, the adhesive layer may be either detachable or undetachable.

When the adhesive layer is detachable, necessary information is printed or typed on the adhesive layer obtained. Printing methods may adopt besides usual printing machine, an electrophotography method, and typing methods may adopt an ink jet method and the like. In case of the ink jet method, a printing agent is ink, and in case of the electrophotography method, a printing agent is toner. Thereafter, to dry and/or fix their printing agents, ultraviolet rays are irradiated. Also, to dry and/or fix their printing agents, there is sometimes a case of heating.

The sheet for carrying information described above may be bonded in forms of folding in two, folding in three, cut folding and in different layering forms, and may be suitably utilized as postcards having two facing surfaces, different business forms, notices and different cards.

Although the present invention will be described particularly by the following Examples and Comparative Examples, the present invention is not limited to the following Examples. Unless otherwise specified, for chemicals etc., used are commercially available highly pure products.

Preparation of Natural Rubber Emulsion of Acrylic-styrene Copolymer

To 200 parts by weight of aqueous emulsion containing 100 parts by weight of natural rubber latex was mixed 10 parts by weight of styrene and 25 parts by weight of methyl methacrylate, followed by adding 0.1 parts by weight of t-butylhydroperoxide (t-BHPO) and 0.3 parts by weight of tetraethylenepentamine (TEPA) as polymerization initiators. To the copolymer natural rubber emulsion obtained from reacting this mixture at 45° C./in nitrogen atmosphere for 2 hours, 5 parts by weight of terpene resin as an adhesion-giving agent were added to give aqueous emulsion containing natural rubber based particles.

EXAMPLE 1-1

Adhesive Composition 1-1

And

Sheet for Carrying Information 1-1

In order to be adjusted to 100 parts by weight to 100 parts by weight of natural rubber based particles, polyethylene glycol diacrylate (trade name: ARONIX M-240, from TOA-GOSEI CO., LTD.) was added to the aqueous emulsion containing natural rubber based particles obtained above and well stirred, thereafter, by elevating the mixture at 50° C. followed by removal of moisture vaporized in vacuo to substitute the dispersed medium in 1 hr. Herein, the weight ratio of aqueous emulsion containing natural rubber based particles to polyethylene glycol diacrylate was 160:100.

To this was added 4 parts by weight of the photopolymerization initiator (trade name: VICURE 55, from Akzo Nobel) to afford ultraviolet curing type pressure-sensitive adhesive composition 1-1.

When measured the moisture content of pressure-sensitive adhesive composition 1-1 obtained, it was 0.5 wt %. The average particle diameter of the natural rubber based particles was 0.2 μm and the dispersibility was uniform.

The pressure-sensitive adhesive composition 1-1 was applied in order to 6 g/m$^2$ on form high-quality paper (trade name: NIP N (70 kg range amount) from Oji Paper Co., Ltd.) using a wire bar, followed by being cured using high-pressure mercury lamp to form the adhesive layer and to give sheet for carrying information 1-1. The applicability also in the cases of whole application and pattern application was well similarly to the case of low absorbable paper. There was no generation of poor states such as poor drying and the like.

After layered together with two surfaces forming the adhesive layer of sheet for carrying information 1-1 obtained, a sealing machine was set to 100 μm of a gap between rollers to do sealing. After sealing, two forms adhered with sufficient strength. When detached these two forms, they could be finely detached without detachment between the adhesive layer and the substrate.

EXAMPLE 1-2

Adhesive Composition 1-2

And

Sheet for Carrying Information 1-2

The similar operation was performed except changing the using amount of polyethylene glycol diacrylate used in adhesive composition 1-1 to 60 parts by weight to give adhesive composition 1-2 and sheet for carrying information 1-2. The adhesive composition 1-2 and sheet for carrying information 1-2 obtained had practically durable performance.

EXAMPLE 1-3

Adhesive Composition 1-3

And

Sheet for Carrying Information 1-3

In order to be adjusted to 100 parts by weight to 100 parts by weight of natural rubber based particles, polyethylene glycol diacrylate (trade name: ARONIX M-240, from TOAGOSEI CO., LTD.) was added to the aqueous emulsion containing natural rubber based particles used in adhesive composition 1-1 and well stirred, thereafter, by elevating the mixture at 50° C. followed by removal of moisture vaporized in vacuo to substitute the dispersed medium in 1 hr. Herein, the weight ratio of aqueous emulsion containing natural rubber based particles to polyethylene glycol diacrylate was 160:100.

On the other hand, in 100 parts by weight of acrylic dimer (trade name: ARONIX M-5600, from TOAGOSEI CO., LTD.) was dissolved 100 parts by weight of the photopolymerization initiator (trade name: VICURE 55, from Akzo Nobel), followed by adding this 10 parts by weight into the above dispersed medium substituent to afford ultraviolet curing type pressure-sensitive adhesive composition 1-3.

When measured the moisture content of pressure-sensitive adhesive composition 1-3 obtained, it was 0.5 wt %. The average particle diameter of the natural rubber based particles was 0.2 μm and the dispersibility was uniform.

The pressure-sensitive adhesive composition 1-3 was applied in order to become 6 g/m² on form high-quality paper (trade name: NIP N (70 kg range amount) from Oji Paper Co., Ltd.) using a wire bar, followed by being cured using high-pressure mercury lamp to form the adhesive layer and to give sheet for carrying information 1-3. The applicability also in the cases of whole application and pattern application was well similarly to the case of low absorbable paper. There was no generation of poor states such as poor drying and the like.

After layered together with two surfaces forming the adhesive layer of sheet for carrying information 1-3 obtained, a sealing machine was set to 60 μm of a gap between rollers to do sealing. After sealing, two forms adhered with sufficient strength. When detached these two forms, they could be finely detached without detachment between the adhesive layer and the substrate.

EXAMPLE 1-4

Adhesive Composition 1-4

And

Sheet for Carrying Information 1-4

The similar operation was performed except changing acrylic dimer used in adhesive composition 1-3 to nonylphenol EO-reformed (n=4) acrylate (ARONIX M-113, from TOAGOSEI CO., LTD.) to give adhesive composition 1-4. Further, except setting a sealing machine to 100 μm of a gap between rollers, the operation similar to sheet for carrying information 1-3 was performed to obtain sheet for carrying information 1-4. The adhesive composition 1-4 and sheet for carrying information 1-4 obtained had good performance.

EXAMPLE 1-5

Adhesive Composition 1-5

And

Sheet for Carrying Information 1-5

The similar operation was performed except changing acrylic dimer used in adhesive composition 1-3 to paracumylphenol EO-reformed (n=1) acrylate (ARONIX M-110, from TOAGOSEI CO., LTD.) to give adhesive composition 1-5. Further, except setting a sealing machine to 100 μm of a gap between rollers, the operation similar to sheet for carrying information 1-3 was performed to obtain sheet for carrying information 1-5. The adhesive composition 1-5 and sheet for carrying information 1-5 obtained had good performance.

EXAMPLE 1-6

Adhesive Composition 1-6

And

Sheet for Carrying Information 1-6

To 100 parts by weight of natural rubber based particles in adhesive composition 1-3, in order to set from Takeda Chemical Industries, Ltd. SBR (trade name: CROSLENE SK-72) as 15 parts by weight, in order to set commercially available silica of average particle diameter 4 μm as 50 parts by weight and in order to set commercially available wheat starch of average particle diameter 15 μm as 150 parts by weight, the similar operation was performed except adding these fillers to obtain adhesive composition 1-6. The operation similar to the case of sheet for carrying information 1-5 was performed to obtain sheet for carrying information 1-6. The adhesive composition 1-6 and sheet for carrying information 1-6 obtained had good performance.

EXAMPLE 1-7

Adhesive Composition 1-7

And

Sheet for Carrying Information 1-7

In order to be adjusted to 100 parts by weight to 100 parts by weight of natural rubber based particles, 70 parts by weight of polyethylene glycol diacrylate (trade name: ARONIX M-240, from TOAGOSEI CO., LTD.) and 30 parts by weight of trimethylol propane EO added triacrylate (trade name: Viscoat #360, from OSAKA ORGANIC CHEMICAL INDUSTRY LTD.) were added to the aqueous emulsion containing natural rubber based particles used in adhesive composition 1-1 and well stirred, thereafter, by elevating the mixture at 50° C. followed by removal of moisture vaporized in vacuo to substitute the dispersed medium in 1 hr. Herein, the weight ratio of aqueous emulsion containing natural rubber based particles to polyethylene glycol diacrylate and trimethylol propane EO added triacrylate was 160:100.

To this was added 4 parts by weight of the photopolymerization initiator (trade name: VICURE 55, from Akzo Nobel) to afford ultraviolet curing type pressure-sensitive adhesive composition 1-7.

When measured the moisture content of pressure-sensitive adhesive composition 1-7 obtained, it was 0.5 weight %. The average particle diameter of the natural rubber based particles was 0.2 μm and the dispersibility was uniform.

The pressure-sensitive adhesive composition 1-7 was applied in order to become 6 g/m$^2$ on form high-quality paper (trade name: NIP N (70 kg range amount) from Oji Paper Co., Ltd.) using a wire bar, followed by being cured using high-pressure mercury lamp to form the adhesive layer and to give sheet for carrying information 1-7. The applicability also in the cases of whole application and pattern application was well similarly to the case of low absorbable paper. There was no generation of poor states such as poor drying and the like.

After layered together with two surfaces forming the adhesive layer of sheet for carrying information 1-7 obtained, a sealing machine was set to 100 μm of a gap between rollers to do sealing. After sealing, two forms adhered with sufficient strength. When detached these two forms, they could be finely detached without detachment between the adhesive layer and the substrate.

Compatative Example 1-1

In 100 parts by weight of polyethylene glycol diacrylate (trade name: ARONIX M-240, from TOAGOSEI CO., LTD.) was dissolved 8 parts by weight of the photopolymerization initiator (trade name: VICURE 55, from Akzo Nobel). The obtained solution was applied in order to become 6 g/m$^2$ on form high-quality paper (trade name: NIP N (70 kg range amount) from Oji Paper Co., Ltd.) using a wire bar, followed by being cured using high-pressure mercury lamp. After layered together with two adhesive surfaces of applied paper obtained, a sealing machine was set to 100 μm of a gap between rollers to do sealing, however, two forms after sealing did not adhere to each other.

Comparitive Example 1-2

Commercially available ultraviolet curing type acrylic pressure-sensitive false adhesive was applied in order to become 6 g/m$^2$ on form high-quality paper (trade name: NIP N (70 kg range amount) from Oji Paper Co., Ltd.) using a wire bar, followed by being cured using high-pressure mercury lamp. After layered together with two adhesive surfaces of applied paper obtained, a sealing machine was set to 100 μm of a gap between rollers to do sealing, however, two forms after sealing did not adhere to each other.

EXAMPLE 2-1

Adhesive Composition 2-1

And

Sheet for Carrying Information 2-1

In order to be adjusted to 100 parts by weight to 100 parts by weight of natural rubber based particles, ethylene glycol diglycidyl ether (trade name: Epolite 400E, from KYOEISHA CHEMICAL Co., LTD.) was added to the aqueous emulsion containing natural rubber based particles obtained previously and well stirred, thereafter, by elevating the mixture at 50° C. followed by removal of moisture vaporized in vacuo to substitute the dispersed medium in 1 hr. Herein, the weight ratio of aqueous emulsion containing natural rubber based particles to ethylene glycol diglycidyl ether was 160:100.

To this was added 4 parts by weight of the photopolymerization initiator (trade name: VICURE 55, from Akzo Nobel) to afford ultraviolet curing type pressure-sensitive adhesive composition 2-1. When measured the moisture content of pressure-sensitive adhesive composition 2-1 obtained, it was 0.5 wt %. The average particle diameter of the natural rubber based particles was 0.2 μm and the dispersibility was uniform.

The pressure-sensitive adhesive composition 2-1 was applied in order to become 6 g/m$^2$ on form high-quality paper (trade name: NIP N (70 kg range amount) from Oji Paper Co., Ltd.) using a wire bar, followed by being cured using high-pressure mercury lamp to form the adhesive layer and to give sheet for carrying information 2-1. The applicability also in the cases of whole application and pattern application was well similarly to the case of low absorbable paper. There was no generation of poor states such as poor drying and the like.

After layered together with two surfaces forming the adhesive layer of sheet for carrying information 2-1 obtained, a sealing machine was set to 100 μm of a gap between rollers to do sealing. After sealing, two forms adhered with sufficient strength. When detached these two forms, they could be finely detached without detachment between the adhesive layer and the substrate.

EXAMPLE 2-2

Adhesive Composition 2-2

And

Sheet for Carrying Information 2-2

The similar operation was performed except changing the using amount of ethylene glycol diglycidyl ether used in adhesive composition 2-1 to 60 parts by weight to give adhesive composition 2-2 and sheet for carrying information 2-2. The adhesive composition 2-2 and sheet for carrying information 2-2 obtained had practically durable performance.

EXAMPLE 2-3

Adhesive Composition 2-3

And

Sheet for Carrying Information 2-3

In order to be adjusted to 100 parts by weight to 100 parts by weight of natural rubber based particles, ethylene glycol diglycidyl ether (trade name: Epolite 400E, from KYOEISHA CHEMICAL Co., LTD.) was added to the aqueous emulsion containing natural rubber based particles used in adhesive composition 2-1 and well stirred, thereafter, by elevating the mixture at 50° C. followed by removal of moisture vaporized in vacuo to substitute the dispersed medium in 1 hr. Herein, the weight ratio of aqueous emulsion containing natural rubber based particles to ethylene glycol diglycidyl ether was 160:100.

On the other hand, in 100 parts by weight of acrylic dimer (trade name: ARONIX M-5600, from TOAGOSEI CO., LTD.) was dissolved 100 parts by weight of the photopolymerization initiator (trade name: VICURE 55, from Akzo Nobel), followed by adding this 10 parts by weight into the above dispersed medium substituent to afford ultraviolet curing type pressure-sensitive adhesive composition 2-3.

When measured the moisture content of pressure-sensitive adhesive composition 2-3 obtained, it was 0.5 wt %. The average particle diameter of the natural rubber based particles was 0.2 µm and the dispersibility was uniform.

The pressure-sensitive adhesive composition 2-3 was applied in order to become 6 g/m$^2$ on form high-quality paper (trade name: NIP N (70 kg range amount) from Oji Paper Co., Ltd.) using a wire bar, followed by being cured using high-pressure mercury lamp to form the adhesive layer and to give sheet for carrying information 2-3. The applicability also in the cases of whole application and pattern application was well similarly to the case of low absorbable paper. There was no generation of poor states such as poor drying and the like.

After layered together with two surfaces forming the adhesive layer of sheet for carrying information 2-3 obtained, a sealing machine was set to 60 µm of a gap between rollers to do sealing. After sealing, two forms adhered with sufficient strength. When detached these two forms, they could be finely detached without detachment between the adhesive layer and the substrate.

EXAMPLE 2-4

Adhesive Composition 2-4

And

Sheet for Carrying Information 2-4

The similar operation was performed except changing acrylic dimer used in adhesive composition 2-3 to nonylphenol EO-reformed (n=4) acrylate (ARONIX M-113, from TOAGOSEI CO., LTD.) to give adhesive composition 2-4. Further, except setting a sealing machine to 100 µm of a gap between rollers, the operation similar to sheet for carrying information 2-3 was performed to obtain sheet for carrying information 2-4. The adhesive composition 2-4 and sheet for carrying information 2-4 obtained had good performance.

EXAMPLE 2-5

Adhesive Composition 2-5

And

Sheet for Carrying Information 2-5

The similar operation was performed except changing acrylic dimer used in adhesive composition 2-3 to paracumylphenol EO-reformed (n=1) acrylate (ARONIX M-110, from TOAGOSEI CO., LTD.) to give adhesive composition 2-5. Further, except setting a sealing machine to 100 µm of a gap between rollers, the operation similar to sheet for carrying information 2-3 was performed to obtain sheet for carrying information 2-5. The adhesive composition 2-5 and sheet for carrying information 2-5 obtained had good performance.

EXAMPLE 2-6

Adhesive Composition 2-6

And

Sheet for Carrying Information 2-6

To 100 parts by weight of natural rubber based particles in adhesive composition 2-3, in order to set from Takeda Chemical Industries, Ltd. SBR (trade name: CROSLENE SK-72) as 15 parts by weight, in order to set commercially available silica of average particle diameter 4 µm as 50 parts by weight and in order to set commercially available wheat starch of average particle diameter 15 µm as 150 parts by weight, the similar operation was performed except adding these fillers to obtain adhesive composition 2-6. The operation similar to the case of sheet for carrying information 2-5 was performed to obtain sheet for carrying information 2-6. The adhesive composition 2-6 and sheet for carrying information 2-6 obtained had good performance.

EXAMPLE 2-7

Adhesive Composition 2-7

And

Sheet for Carrying Information 2-7

In order to be adjusted to 100 parts by weight to 100 parts by weight of natural rubber based particles, 75 parts by weight of ethylene glycol diglycidyl ether (trade name: Epolite 400E, from KYOEISHA CHEMICAL Co., LTD.) and 25 parts by weight of trimethylol propane triglycidyl ether (trade name: Epolite 100MF, from KYOEISHA CHEMICAL Co., LTD.) were added to the aqueous emulsion containing natural rubber based particles used in adhesive composition 2-1 and well stirred, thereafter, by elevating the mixture at 50° C. followed by removal of moisture vaporized in vacuo to substitute the dispersed medium in 1 hr. Herein, the weight ratio of aqueous emulsion containing natural rubber based particles to ethylene glycol diglycidyl ether and trimethylol propane triglycidyl ether was 160:100.

To this was added 4 parts by weight of the photopolymerization initiator (trade name: VICURE 55, from Akzo Nobel) to afford ultraviolet curing type pressure-sensitive adhesive composition 2-7.

When measured the moisture content of pressure-sensitive adhesive composition 2-7 obtained, it was 0.5 wt %. The average particle diameter of the natural rubber based particles was 0.2 μm and the dispersibility was uniform.

The pressure-sensitive adhesive composition 2-7 was applied in order to become 6 g/m² on form high-quality paper (trade name: NIP N (70 kg range amount) from Oji Paper Co., Ltd.) using a wire bar, followed by being cured using high-pressure mercury lamp to form the adhesive layer and to give sheet for carrying information 2-7. The applicability also in the cases of whole application and pattern application was well similarly to the case of low absorbable paper. There was no generation of poor states such as poor drying and the like.

After layered together with two surfaces forming the adhesive layer of sheet for carrying information 2-7 obtained, a sealing machine was set to 100 μm of a gap between rollers to do sealing. After sealing, two forms adhered with sufficient strength. When detached these two forms, they could be finely detached without detachment between the adhesive layer and the substrate.

Comparative Example 2-1

In 100 parts by weight of ethylene glycol diglycidyl ether (trade name: Epolite 400E, from KYOEISHA CHEMICAL Co., LTD.) was dissolved 8 parts by weight of the photopolymerization initiator (trade name: VICURE 55, from Akzo Nobel). The obtained solution was applied in order to become 6 g/m² on form high-quality paper (tradename: NIP N (70 kg range amount) from Oji Paper Co., Ltd.) using a wire bar, followed by being cured using high-pressure mercury lamp. After layered together with two adhesive surfaces of applied paper obtained, a sealing machine was set to 100 μm of a gap between rollers to do sealing, however, two forms after sealing did not adhere to each other.

Comparative Example 2-2

Commercially available ultraviolet curing type acrylic pressure-sensitive false adhesive was applied in order to become 6 g/m² on form high-quality paper (trade name: NIP N (70 kg range amount) from Oji Paper Co., Ltd.) using a wire bar, followed by being cured using high-pressure mercury lamp. After layered together with two adhesive surfaces of applied paper obtained, a sealing machine was set to 100 μm of a gap between rollers to do sealing, however, two forms after sealing did not adhere to each other.

EXAMPLE 3-1

Adhesive Composition 3-1

And

Sheet for Carrying Information 3-1

In order to be adjusted to 100 parts by weight to 100 parts by weight of natural rubber based particles, polyethylene glycol diacrylate (trade name: ARONIX M-240, from TOAGOSEI CO., LTD.) was added to the aqueous emulsion containing natural rubber based particles obtained above and well stirred, thereafter, by elevating the mixture at 50° C. followed by removal of moisture vaporized in vacuo to substitute the dispersed medium in 1 hr. Herein, the weight ratio of aqueous emulsion containing natural rubber based particles to polyethylene glycol diacrylate was 160:100.

On the other hand, in 100 parts by weight of acryloyl oligoester was dissolved 100 parts by weight of the photopolymerization initiator (trade name: VICURE 55, from Akzo Nobel), followed by adding this 10 parts by weight into 200 parts by weight of the above dispersed medium substituent to afford ultraviolet curing type pressure-sensitive adhesive composition 3-1.

When measured the moisture content of pressure-sensitive adhesive composition 3-1 obtained, it was 0.5 wt %. The average particle diameter of the natural rubber based particles was 0.2 μm and the dispersibility was uniform.

The pressure-sensitive adhesive composition 3-1 was applied in order to 6 g/m² on form high-quality paper (trade name: NIP N (70 kg range amount) from Oji Paper Co., Ltd.) using a wire bar, followed by being cured using high-pressure mercury lamp to form the adhesive layer and to give sheet for carrying information 3-1. The applicability also in the cases of whole application and pattern application was well similarly to the case of low absorbable paper. There was no generation of poor states such as poor drying and the like.

After layered together with two surfaces forming the adhesive layer of sheet for carrying information 3-1 obtained, a sealing machine was set to 160 μm of a gap between rollers to do sealing. After sealing, two forms adhered with sufficient strength. When detached these two forms, they could be finely detached without detachment between the adhesive layer and the substrate.

EXAMPLE 3-2

Adhesive Composition 3-2

And

Sheet for Carrying Information 3-2

In order to be adjusted to 100 parts by weight to 100 parts by weight of natural rubber based particles, 91 parts by weight of polyethylene glycol diacrylate (trade name: ARONIX M-240, from TOAGOSEI CO., LTD.) and 9 parts by weight of acryloyl oligoester were added to the aqueous emulsion containing the same natural rubber based particles as used in adhesive composition 3-1 and well stirred, thereafter, by elevating the mixture at 50° C. followed by removal of moisture vaporized in vacuo to substitute the dispersed medium in 1 hr.

To this was added 4 parts by weight of the photopolymerization initiator (trade name: VICURE 55, from Akzo Nobel) to afford ultraviolet curing type pressure-sensitive adhesive composition 3-2.

When measured the moisture content of pressure-sensitive adhesive composition 3-2 obtained, it was 0.5 wt %. The average particle diameter of the natural rubber based particles was 0.2 μm and the dispersibility was uniform.

The pressure-sensitive adhesive composition 3-2 was applied in order to 6 g/m² on form high-quality paper (trade name: NIP N (70 kg range amount) from Oji Paper Co., Ltd.) using a wire bar, followed by being cured using high-pressure mercury lamp to form the adhesive layer and to give sheet for carrying information 3-2. The applicability also in the cases of whole application and pattern application was well similarly to the case of low absorbable paper. There was no generation of poor states such as poor drying and the like.

After layered together with two surfaces forming the adhesive layer of sheet for carrying information 3-2 obtained, a sealing machine was set to 100 μm of a gap between rollers to do sealing. After sealing, two forms adhered with sufficient strength. When detached these two forms, they could be finely detached without detachment between the adhesive layer and the substrate.

EXAMPLE 3-3

Adhesive Composition 3-3

And

Sheet for Carrying Information 3-3

In order to be adjusted to 100 parts by weight to 100 parts by weight of natural rubber based particles, ethylene glycol diglycidyl ether (trade name: Epolite 400E, from KYOE-ISHA CHEMICAL Co., LTD.) was added to the aqueous emulsion containing the same natural rubber based particles as used in adhesive composition 3-1 and well stirred, thereafter, by elevating the mixture at 50° C. followed by removal of moisture vaporized in vacuo to substitute the dispersed medium in 1 hr. Herein, the weight ratio of aqueous emulsion containing natural rubber based particles to polyethylene glycol diacrylate was 160:100.

On the other hand, in 100 parts by weight of acryloyl oligoester was dissolved 100 parts by weight of the photopolymerization initiator (trade name: VICURE 55, from Akzo Nobel), followed by adding this 10 parts by weight into the above dispersed medium substituent to afford ultraviolet curing type pressure-sensitive adhesive composition 3-3.

When measured the moisture content of pressure-sensitive adhesive composition 3-3 obtained, it was 0.5 wt %. The average particle diameter of the natural rubber based particles was 0.2 μm and the dispersibility was uniform.

The pressure-sensitive adhesive composition 3-3 was applied in order to 6 g/m² on form high-quality paper (trade name: NIP N (70 kg range amount) from Oji Paper Co., Ltd.) using a wire bar, followed by being cured using high-pressure mercury lamp to form the adhesive layer and to give sheet for carrying information 3-3. The applicability also in the cases of whole application and pattern application was well similarly to the case of low absorbable paper. There was no generation of poor states such as poor drying and the like.

After layered together with two surfaces forming the adhesive layer of sheet for carrying information 3-3 obtained, a sealing machine was set to 160 μm of a gap between rollers to do sealing. After sealing, two forms adhered with sufficient strength. When detached these two forms, they could be finely detached without detachment between the adhesive layer and the substrate.

EXAMPLE 3-4

Adhesive Composition 3-4

And

Sheet for Carrying Information 3-4

To 100 parts by weight of natural rubber based particles in adhesive composition 3-1, in order to set from Takeda Chemical Industries, Ltd. SBR (trade name: CROSLENE SK-72) as 15 parts by weight, in order to set commercially available silica of average particle diameter 4 μm as 50 parts by weight and in order to set commercially available wheat starch of average particle diameter 15 μm as 150 parts by weight, the similar operation was performed except adding these fillers to obtain adhesive composition 3-4. The operation similar to the case of sheet for carrying information 3-1 was performed to obtain sheet for carrying information 3-4. The adhesive composition 3-4 and sheet for carrying information 3-4 obtained had good performance.

EXAMPLE 3-5

Adhesive Composition 3-5

And

Sheet for Carrying Information 3-5

In place of acryloyl oligoester used in adhesive composition 3-1, by using ethylene oxide-modified succinic acid acrylate, β-carboxyethyl acrylate, ω-carboxy-polycaprolactone monoacrylate, a copolymer of 50 parts by mole of ethyl acrylate and 50 parts by mole of lauryl acrylate having average 5.6 mole of carboxyl groups in one mole molecule, 2-acryloyloxyethyl phthalate, and the like, adhesive composition 3-5 and sheet for carrying information 3-5 may be obtained. The adhesive composition 3-5 and sheet for carrying information 3-5 obtained have good performance.

INDUSTRIAL APPLICABILITY

An adhesive composition wherein natural rubber based particles are uniformly dispersed in a radiation setting compound is cured by radiation to make a pressure-sensitive adhesive layer on a substrate, thereby: sufficient adhesiveness is obtained; different fillers sufficiently charged; drying time after application is short; both overall application and pattern application are readily performed; application can be performed on different substrates; and sufficient adhesive strength between the substrate and the pressure-sensitive adhesive layer can be realizes. This adhesive composition may be manufactured by: mixing aqueous emulsion containing the natural rubber based particles and the radiation setting compound; elevating a temperature of the mixture while stirring; removing vaporized water in the aqueous emulsion; and replacing the water as the medium wherein the natural rubber based particles are dispersed by phase transition with the radiation setting compound.

The invention claimed is:
1. A pressure-sensitive adhesive composition comprising rubber particles uniformly dispersed in a radiation setting compound, wherein
said rubber particles are of a copolymer of a natural-rubber-based rubber and at least one of an acrylic monomer and a styrene monomer,
said rubber particles having an average particle diameter 0.01 micrometer to 5 micrometer,
a moisture content is not more than 10 wt %, and
a ratio of said radiation setting compound to 100 parts by weight of said rubber particles is 50 parts to 500 parts by weight; and
a second acrylic compound which is at least one of an acrylic monomer and an acrylic oligomer of 2 to 10 in polymerization degree.

2. A pressure-sensitive adhesive composition comprising rubber particles uniformly dispersed in a radiation setting compound, wherein
said rubber particles are of a copolymer of a natural-rubber-based rubber and at least one of an acrylic monomer and a styrene monomer,
said rubber particles having an average particle diameter of 0.01 micrometer to 5 micrometer,
a moisture content is not more than 10 wt %, and
a ratio of said radiation setting compound to 100 parts by weight of said rubber particle is 50 parts to 500 parts by weight; and
a carboxyl group-containing acrylic compound which is an ester form (I) having a structure where epoxide (meth)acrylate having a hydroxyl group is bonded with a polycarboxylic acid by ester.

3. A pressure-sensitive adhesive composition comprising rubber particles uniformly dispersed in a radiation setting compound, wherein
said rubber particles are of a copolymer of a natural-rubber-based rubber and at least one of an acrylic monomer and a styrene monomer,
said rubber particles having an average particle diameter of 0.01 micrometer to 5 micrometer,
a moisture content is not more than 10 wt %, and
a ratio of said radiation setting compound to 100 parts by weight of said rubber particle is 50 parts to 500 parts by weight; and
a carboxyl group-containing acrylic compound which is an ester form (II) having a structure where a hydroxy acid or a hydroxy acid polymer is bonded with a (meth)acrylic acid by ester.

4. A method of manufacturing a pressure-sensitive adhesive composition that comprises rubber particles uniformly dispersed in a radiation setting compound, wherein
said rubber particles are of a copolymer of a natural-rubber-based rubber and at least one of an acrylic monomer and a styrene monomer,
an average particle diameter of said rubber particles is 0.01 micrometer to 5 micrometer,
a moisture content is not more than 10 wt %, and
a ratio of said radiation setting compound to 100 parts by weight of said rubber particles is 50 parts to 500 parts by weight,
said method comprising:
mixing an aqueous emulsion containing said natural rubber based particle(s) with said radiation setting compound; and
elevating the temperature of the mixture while stirring, removing vaporized water from the aqueous emulsion and replacing water with said radiation setting compound as a medium wherein the natural rubber based particles are dispersed.

5. A method of manufacturing the adhesive composition according to claim 4, wherein a ratio of said radiation setting compound to 50 parts by weight of said natural rubber based particles is 25 parts to 250 parts by weight.

* * * * *